United States Patent [19]
Conway et al.

[11] Patent Number: 5,608,657
[45] Date of Patent: Mar. 4, 1997

[54] INTERACTIVE DIAGNOSTIC SYSTEM

[75] Inventors: Richard B. Conway, Pataskala; Edward G. Wendell, Columbus, both of Ohio

[73] Assignee: Delta H. Systems, Inc., Columbus, Ohio

[21] Appl. No.: 591,835

[22] Filed: Jan. 25, 1996

[51] Int. Cl.[6] .................................................. G05B 1/04
[52] U.S. Cl. ..................... 364/551.01; 364/184; 364/185
[58] Field of Search ........................ 340/825.06; 364/184, 364/185, 186, 138

[56] References Cited

U.S. PATENT DOCUMENTS

| | | | |
|---|---|---|---|
| 4,615,009 | 9/1986 | Battocletti et al. | 364/483 |
| 4,912,382 | 3/1990 | Koenig et al. | 318/563 |
| 4,957,690 | 9/1990 | Fennern | 376/216 |
| 5,363,047 | 11/1994 | Dresti et al. | 324/510 |
| 5,410,469 | 4/1995 | Sakamoto et al. | 364/138 |

OTHER PUBLICATIONS

"7800 Series Burner Control", Rev. Oct. 1992, Honeywell, Inc.
"Q7700 Communication Interface Base Unit", Rev. Nov. 1991, Honeywell, Inc.
"Tele–Fault II Form 8966 First–Outage Fault Finder", Protection Controls, Inc.

*Primary Examiner*—Ellis B. Ramirez
*Assistant Examiner*—Demetra Smith
*Attorney, Agent, or Firm*—Mueller and Smith, LPA

[57] ABSTRACT

A diagnostic system for rapidly trouble-shooting safety system induced shutdowns of production facilities such as combustion systems. A passive monitoring interface apparatus is mounted at the combustion system which includes a detector network coupled with the power source of the combustion safety system itself to provide an interface output condition representing the circuit status of each electrical contact. An identifier component is incorporated in the interface apparatus along with a connector assembly. The detector network may be manually programmed utilizing a terminal strip and jumpering to accommodate it to wide range of safety system circuit architecture. The apparatus further includes a connector for coupling via flexible cable with a portable interrogator assembly which is microprocessor driven and incorporates non-volatile memory retaining the configuration data associated with each numerically identified interface apparatus. A line technician carries this interrogator assembly to the vicinity of such interface apparatus for trouble-shooting purposes. The memory retained configuration data is utilized to configure the interrogator assembly for each facility and the assembly further includes a modem-based telecommunications capability such that the data may be downloaded to a remote consulting expert. The expert may communicate with the line technician by altering the communication system from a data transfer mode to a voice mode.

22 Claims, 31 Drawing Sheets

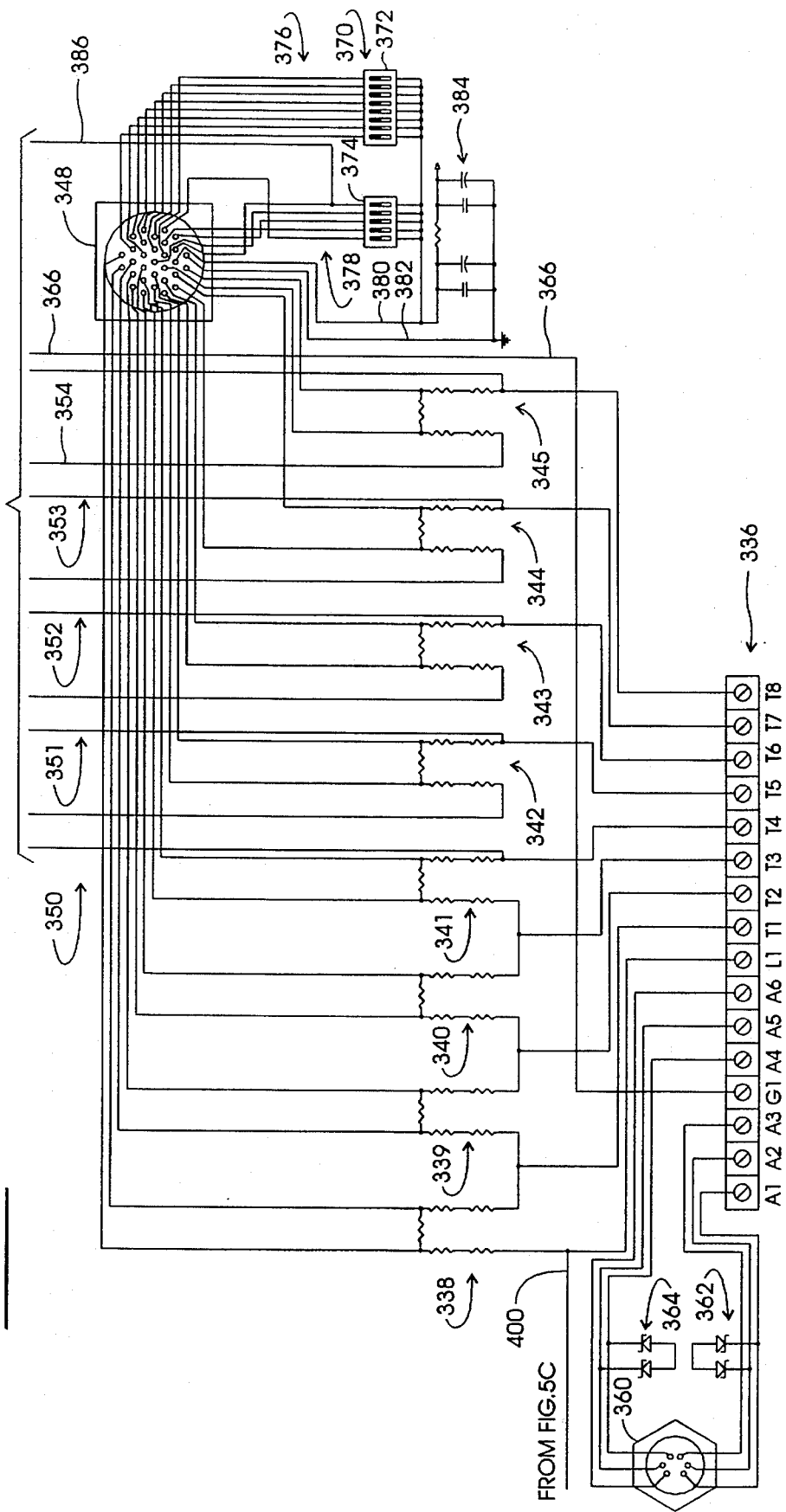

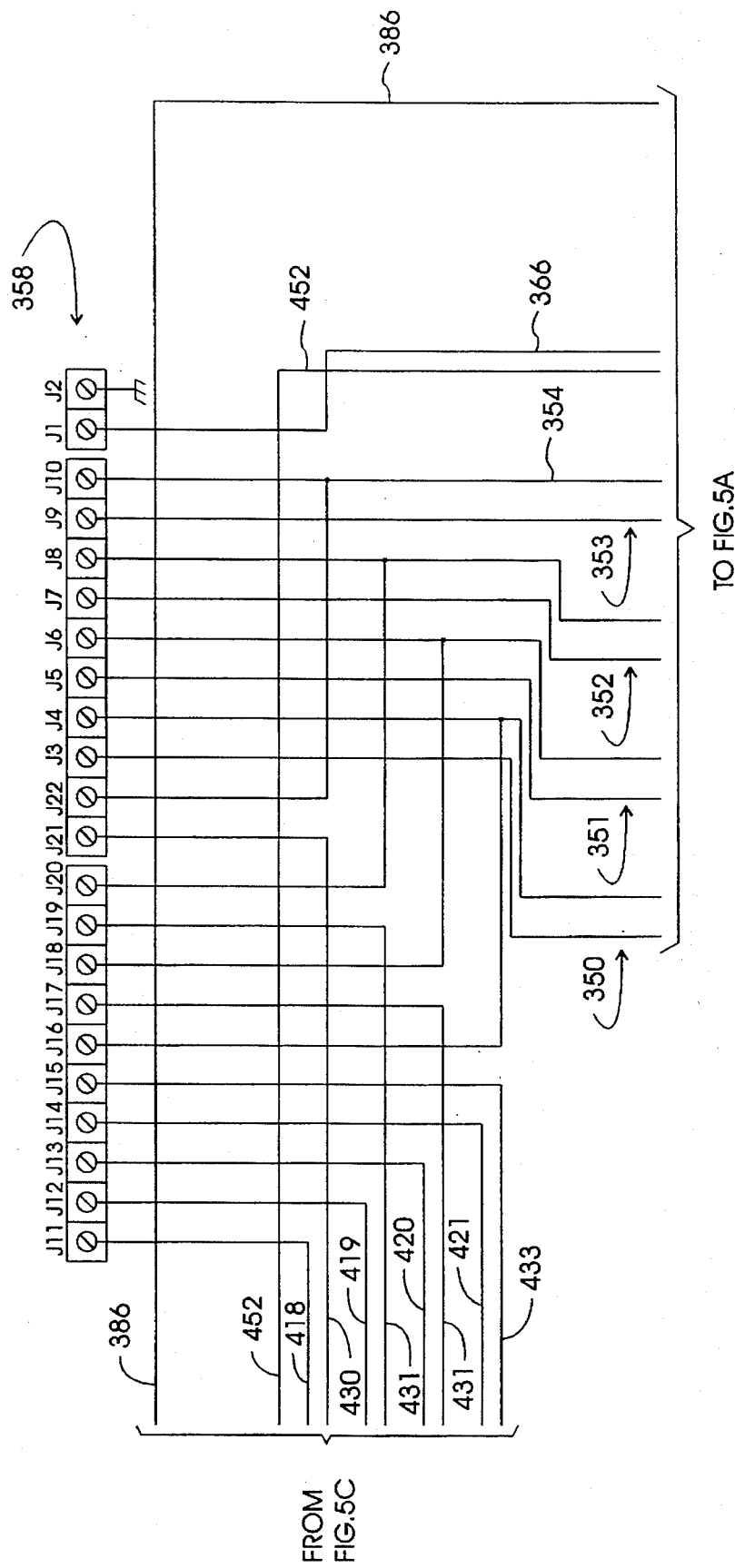

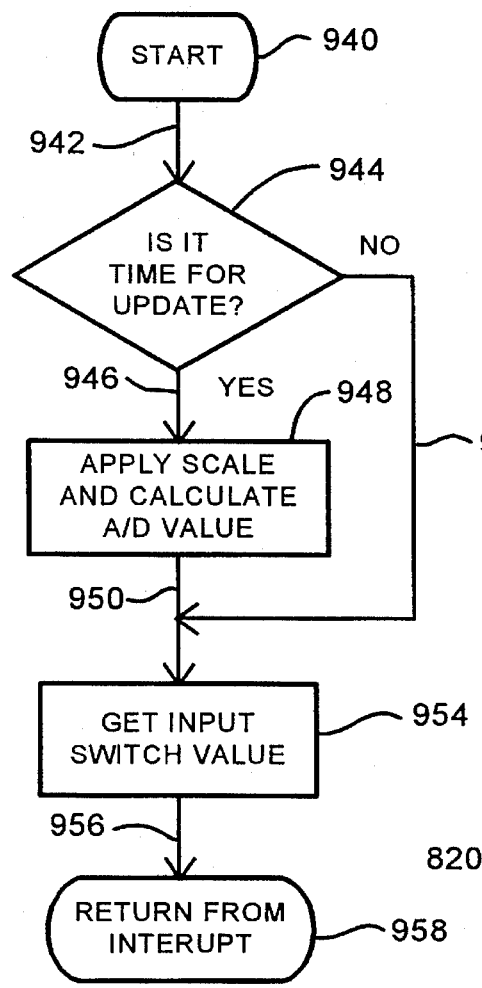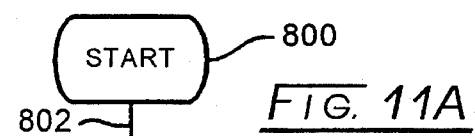

INTERACTIVE DIAGNOSTIC SYSTEM

BACKGROUND

A substantial number of industrial production facilities utilize production stages or regions, the operation of which is monitored by safety systems. Such supervisory or safety systems have been mandated over the past by industrial insurance entities, government regulating agencies, and the like, and typically are configured as a network of process monitors and associated electromagnetically driven relay contacts. Generally, these systems require a sequence of proven steps or activities to occur during a process start-up, and during a production or run mode, will shut down the process where a monitored parameter falls beyond safety limits. Very often, such shut downs are quite costly, particularly under circumstances wherein the shut-down slows or terminates the operation of the entire or substantial portion of a production line. Failure of start-up because of safety system lock-out typically has the same unfortunate consequences, line personnel remaining idle while the failure of the system is analyzed and then correction is made.

Because of the potential costs of such safety system lock-outs, substantial or large industrial plants may employ fulltime, in-plant analysts or experts for the purpose of more quickly resolving safety lock-out problems and assuring substantially uninterrupted performance of a production line. Large industrial entities typically are capable of cost justifying elaborate, hard wired status monitoring systems and associated software to aid in achieving continuous production performance. However, small to medium size production entities, representing the greater number of industrial plants utilizing such systems, must rely on the abilities of talented production or line technicians or outside consulting firms to solve their safety system lock-out problems. Often, the number of variables involved in trouble shooting a safety system becomes overwhelming to the technician. Generally, where the line technician is unable to start or restart a safety monitor process, then the consultant is retained with attendant production loss during travel time, system familiarization activities, and the like. In the latter regard, generally, very few of the systems are identically configured, thus time is expended in a review of the system design at hand.

A common industrial production stage incorporating such safety lockout feature employs combustion systems. These systems utilize gas or oil fired installations found, for example, in industrial finishing production lines with washing and drying stages. Other heating systems will be found, for example, in larger ceramic production facilities. Starting up such combustion systems under safety system monitoring typically will require a sequential closure of series connected relay contacts as well as parallel coupled lock-out contacts associated with the operation of blowers, the proving of pilot flames, and the like. Following start-up, in the course of production, essentially any of the relay driven contacts may drop out in consequence of an out of specification monitored parameter to shut down the process. Upon the occurrence of such circumstances, it thus becomes imperative to know which of the contacts has dropped out and why it happened. The requisite analysis often is elusive and beyond the immediate problem solving capabilities of the line technician. Thus, down time often is incurred by the more common smaller sized industrial concerns with an attendant unfortunate financial impact.

SUMMARY

The present invention is addressed to an interactive diagnostic system particularly suited for trouble-shooting industrial combustion systems. With the system, a universally adaptive lower cost passive interface device is mounted permanently in adjacency with the safety control network associated with a given production line. Accommodation is made for essentially all variations of safety control architecture through the use of straightforward jumpering techniques carded out during set-up of the system. In this regard, such simple jumpering accommodates for safety system architecture of both serial inter-associated contacts as well as parallel contacts and series/parallel configurations. Both in the interest of simplicity of installation and for the purpose of providing a unique synchronization with the alternating current sources associated with the safety systems, the interface device employs that same power supply as its own source for the purpose of evaluating the circuit completing status of safety contacts. To provide identification of each combustion facility or the like, a unique, electronically assessible numeric identification is assigned to each installed interface device.

The system further includes a portable interrogation assembly which is carded to the immediate vicinity of the installed interface device by a line technician for the purpose of carrying out diagnostics either in a start-up mode or in a running mode for the purpose of analyzing spurious shut-downs. Under microprocessor control and incorporating non-volatile memory, the assembly is employed initially during the set-up of an interface device to record safety system architecture or configuration data. Such data, which typically is different or unique for each facility, is retained in the non-volatile memory in conjunction with the noted unique identification number. Thus, subsequently upon the occurrence of a safety system induced shut-down, the interrogator assembly is electrically coupled by a flexible cable to the monitor interface apparatus and the condition of each system contact is evaluated by the interrogator assembly which provides a readout of the condition of all of the contacts of the system. Additionally, where analog outputs are involved such as flame monitors or the like, that analog output is interpreted and displayed at a screen readout. The set-up for the unique combustion system or the like which is being evaluated is essentially immediate, all of the configuration data being available in memory and the interrogator assembly automatically adjusting scaling factors, gain, filtering, and the like for the particular safety system which is the subject of trouble-shooting. Time essentially always being of the essence in such shut-down instances, no interval of time is required to withdraw records and evaluate system configuration as a pretext to understanding the overall status of the safety system. Should the line technician be unable to satisfactorily trouble-shoot the downed system, the interrogator assembly additionally includes a telephone line input which may communicate with a consulting expert or expert team which may be located quite remotely from the production facility. Through the utilization of the onboard modem of the interrogator assembly, the data collected with respect to the safety system immediately is transmitted to that remote locale such that the consultant has immediate access to the condition of all analog signals and circuit states of safety system contacts. By switching from a data transfer mode to a voice mode, the remote parties may communicate such that the at site line technician becomes the eyes and ears of the remote expert. Down time normally required for the travel of a consultant and review of the setup of a particular safety system is eliminated and the promotion of rapid effective troubleshooting is achieved.

As another feature, the invention provides a diagnostic system for the rapid trouble-shooting analysis of a production facility. The safety systems typically will include a source of electric power and operationally identifiable electrical contacts coupled with the source. These contacts have a given network configuration and exhibit a closed circuit condition enabling the operation of the production facility and an open circuit condition disabling such operation. The facility further includes a production parameter monitor providing an analog output as a variable electrical parameter. The diagnostic system comprises a monitoring interface apparatus mountable at the production facility. This interface apparatus includes first terminals electrically connectable with the electrical contacts. A detector network is provided which is electrically coupled with the first terminals and the source and which is configured in circuit continuity test relationship across each of the electrical contacts. The network derives an interface output condition when an electrical contact exhibits an open circuit condition. An identifier component is incorporated in the monitoring interface apparatus having an adjustable circuit configuration for providing a unique identifier condition corresponding with the production facility with which the interface apparatus is associated. Second terminals are provided which are electrically connectable with the production parameter monitor to convey its analog output and a connector assembly is electrically coupled with the detector network, the identifier component, and the second terminals.

The diagnostic system further includes an interrogator assembly which comprises a portable housing. A coupling assembly is provided having a terminal assembly which is hand connectable with the connector assembly of the monitoring interface apparatus and extends to the housing for conveying the interface output condition, the identifier condition, and the analog output. An address deriving network is provided within the housing which is electrically coupled with the coupling assembly for deriving an identifier signal corresponding with the unique identifier condition. A fault detector network is provided within the housing which is electrically coupled with the coupling assembly and is responsive to the interface output to derive contact condition signals corresponding with the open and closed circuit conditions. An input signal treatment network including an amplifier stage is provided within the housing which is electrically coupled with the coupling assembly and is responsive to the analog output for deriving a treated parameter signal. Next, an amplification network is provided within the housing which has an input responsive to the treated parameter signal and has a gain defining network configurable to derive different amplification gain values and serves to provide a selectively amplified parameter signal. A first selector network is provided within the housing which is controllable in accordance with configuration data corresponding with the network configuration to configure the gain defining network in correspondence with the analog output electrical parameter. An analog-to-digital converter is provided within the housing which is responsive to the amplifier parameter signal for deriving a digital parameter output corresponding therewith. A memory is provided within the housing for retaining the configuration data and data corresponding with the interface output with respect to each identifier signal. A display is mounted upon the housing and is responsive to display signals for deriving a visually perceptible readout in correspondence therewith. A modem arrangement is provided which is connectable with a communication system and is responsive to a control input for effecting data mode conveyance of the memory retained data, the digital parameter output, and the contact condition signals to a computer located at a remote site. A manual input arrangement is mounted with the housing for entering the configuration data into the memory and providing manual command signals. A processor is provided within the housing which is responsive to the identifier signal for accessing the memory-retained configuration data and for effecting control of the first selector network and is responsive to the digital parameter output and the contact condition signals to provide the display signals and the modem control input.

Other objects of the invention will, in part, be obvious and will, in part, appear hereinafter. The invention, accordingly, comprises the system and apparatus possessing the construction, combination of elements, arrangement of parts, and steps which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIGS. 5A–5C combine as labeled thereon to provide an electrical schematic drawing of a monitoring interface apparatus employed with the system of the invention;

FIGS. 11A–11C combine to provide a flow chart showing a main loop program for the processor of the interrogator assembly of the invention;

FIG. 12 is a flow chart describing the strobe interrupt components of the software employed with the processor of the interrogator assembly of the invention;

DETAILED DESCRIPTION

The system of the invention is particularly suited for utilization in the analysis of combustion safety systems which have become problematic. In the latter regard, the systems generally will fail in either of two modes. Initially, the systems simply may fail to start at the commencement of a given production cycle. Alternately, the systems may shut down the combustion system in the course of a course of normal operation. Following such shut down, very often the systems may be restarted with no apparent difficulty, only to shut down again perhaps a few days later for no apparent reason. This requires an ongoing or running analysis including the development of a history of the performance of those safety contacts which have opened and, particularly those which may have opened first in a sequence of contact openings.

Figure 1:
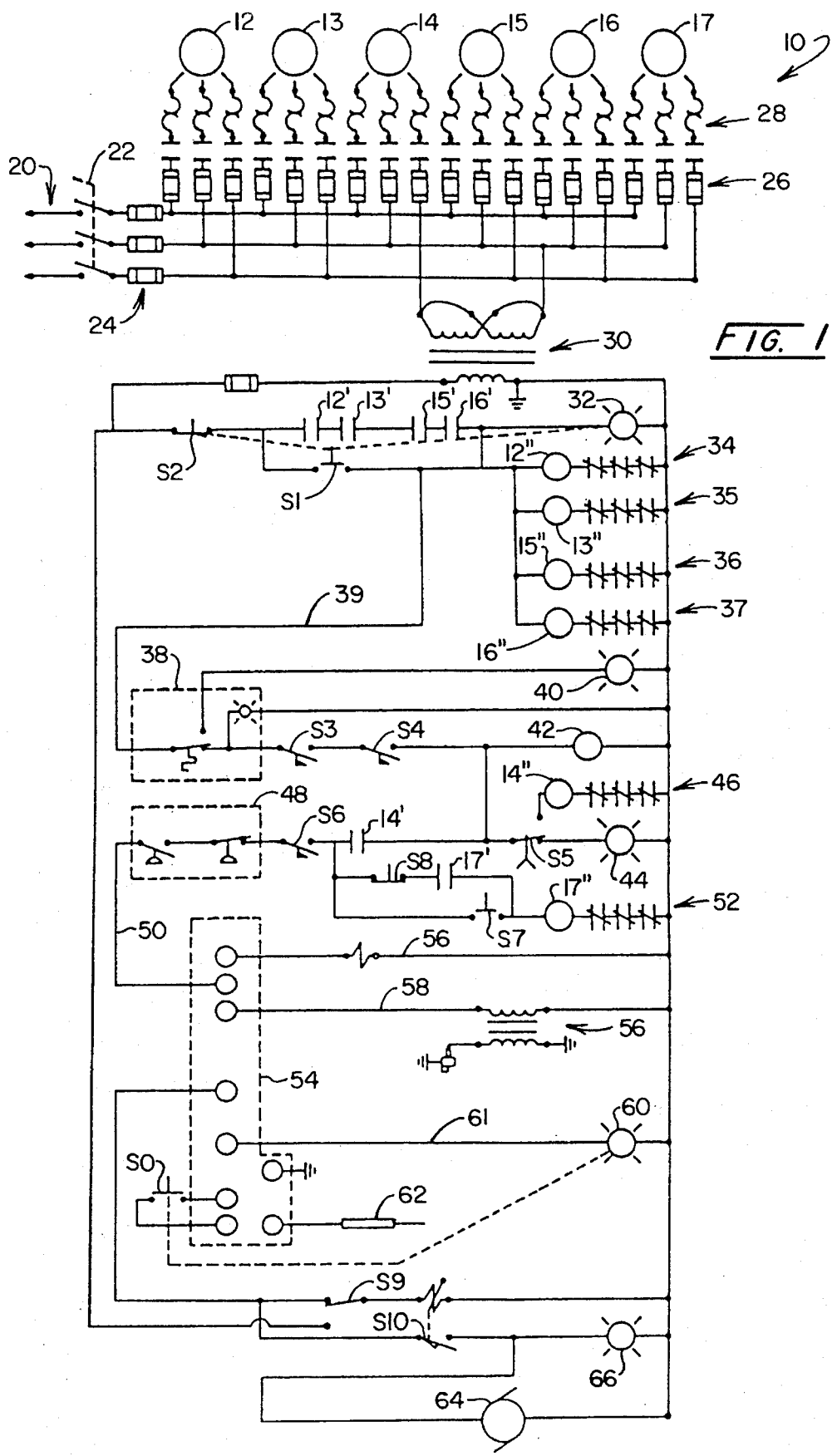
FIG. 1 is a schematic drawing illustrating a typical safety system employed with a combustion facility.

Looking to FIG. 1, a diagram is shown generally at 10 of a combustion facility safety system of a single burner type. Such systems are present in, for example, the finishing lines of great numbers of small to medium sized industrial plants. For the exemplary system 10, six three-phase electric drive motors are represented at 12–17. In conventional fashion, these motors are driven from a three phase utility source 20 which is shown directed through a main input switch 22 to extend through three fuses 24 to a series of 18 starter contacts represented at 26 and a corresponding array of 18 heaters or thermal overload relays represented generally at 28. Motors 12–18 may, respectively, provide motive input for: blower recirculation, blower exhaust, blower combustion, two instances of blower air seal, and lastly, a conveyor motor 17. Two of the input power source phases are tapped by a control transformer. 30 which supplies an a.c. power source for the safety system components. To start the system, the operator actuates switch S1 to a closed orientation momentarily. This causes an electromagnetic closure of contacts 12', 13', 15', and 16' to effect illumination of an on light 32 and the energization of corresponding electromagnetic relay drives 12", 13", 15", and 16". These latter components are shown coupled with normally closed overload contacts represented, respectively, at 34–37. This activity then effects the energization of motors 12, 13, 15, and 16 as well as the application of control power via line 39 to an oven temperature limit control system represented within dashed boundary 38. This is a limit device having a switch which will open to illuminate warning light 40 in the event of excessive oven temperature. With recirculation air flow properly present as well as exhaust air flow present as developed from respective motors 12 and 13, air flow activated switches S3 and S4 respectively close with the proving of recirculation air flow and exhaust air flow. Then, a purge timer 42 commences a timeout selected for clearing the gas volume of the system. During this interval, switch S5 is closed and the purging indicator light 44 is illuminated. At the completion of purge timeout, switch S5 is actuated to, in turn, activate switch drive relay 14" which is seen coupled with normally closed overload contacts 46. Activation of the electromagnetic device 14" will effect activation of motor 14 with closure of contacts 14'. With all components proven through the purge timing and the activation of the combustion air blow components as driven from motor 14, air flow driven switch (combustion air flow) S6 will be closed if air flow is correct. Switch S6 is seen coupled in series with a high-low gas pressure switch system represented within dashed boundary 48. The gas pressure safety control function 48 typically will include a low gas pressure switch which is normally open and closes upon application of proper gas pressure. Should the pressure of the gas exceed a given set point, a normally closed switch within the function 48 will open. Gas pressure being appropriately proven at function 48, an enabling power is supplied to line 50.

Closure of the contacts 14' as associated with combustion blower motor 14 also enables a conveyor energization network including conveyor motor contact 17' and associated electromagnetic drive 17", the latter drive being connected in parallel with thermal overload contacts represented generally at 52. The conveyor may be started by the line technician upon closure of normally open switch S7. Additionally, a normally closed stop switch is shown associated at S8 providing for the stopping of the conveyor driven motor 17.

With the proving of the above generally series coupled contacts, power then is applied via line 50 to the prime relay of the system, the function of which is incorporated within the dashed boundary 54 and is generally referred to as the "flame safeguard" function. In general, the function 54 represents the heart of the combustion system. Upon proving the contacts discussed above, then it is considered safe to ignite the system. Initially, a pilot flame is ignited utilizing an ignition transformer and associated spark plug as represented generally at 56 within line 58 and a pilot valve is activated as represented at line 56. A pilot switch S0 is acuated upon illumination of a ready to ignite light 60 within line 61. The presence of an appropriate pilot flame is detected by a flame scanner or flame rod represented at 62. A variety of these devices are available in the marketplace, all providing an analog as opposed to digital output in terms of a d.c. or a.c. voltage or current having any of a variety of scales or ranges depending upon the manufacturer. The system 10 also may include additional switches as at S9 for testing purposes. In this regard, switch S 10 is an auxiliary safety shut-off valve switch. A secondary safety shut-off valve is represented at 64, the status of which is indicated by a lamp indicator 66.

The system of the present invention looks to achieving rapid trouble-shooting for such safety systems as at 10 with a goal of substantially lessening production down time. This goal is achieved at practical cost with a system which combines an installation flexible and maually programmable monitoring interface apparatus which is mounted at each combustion system control in combination with a portable interrogator instrument or assembly which may be carried by the line technician from combustion system interface to combustion system interface and which is plugged into the interface and provides a readout uniquely identifying the status of the safety system contacts as well as the flame signal. This interrogating device may be utilized in conjunction, for example, with a portable laptop type computer such that technicians may perform sophisticated analysis of the safety systems at the site. Additionally, the interrogating apparatus performs in conjunction with a telephone line in a data mode wherein the information developed from its connection with the interface may be transmitted telephonically to an expert or consultant typically located at some remote region providing 24 hour service. A portable telephone is employed with the interrogator instrument which is used by the technician in conjunction with voice mode communication with the remotely located combustion consultant or expert. As such, the line technician, working at the site of a problem, becomes the eyes and ears of the remote consulting expert. With the system, the goal of achieving shortened down time is reached and the time of the consulting expert is used most efficiently, for example with no requirement for travel time and instrumentation installation.

Figure 2:
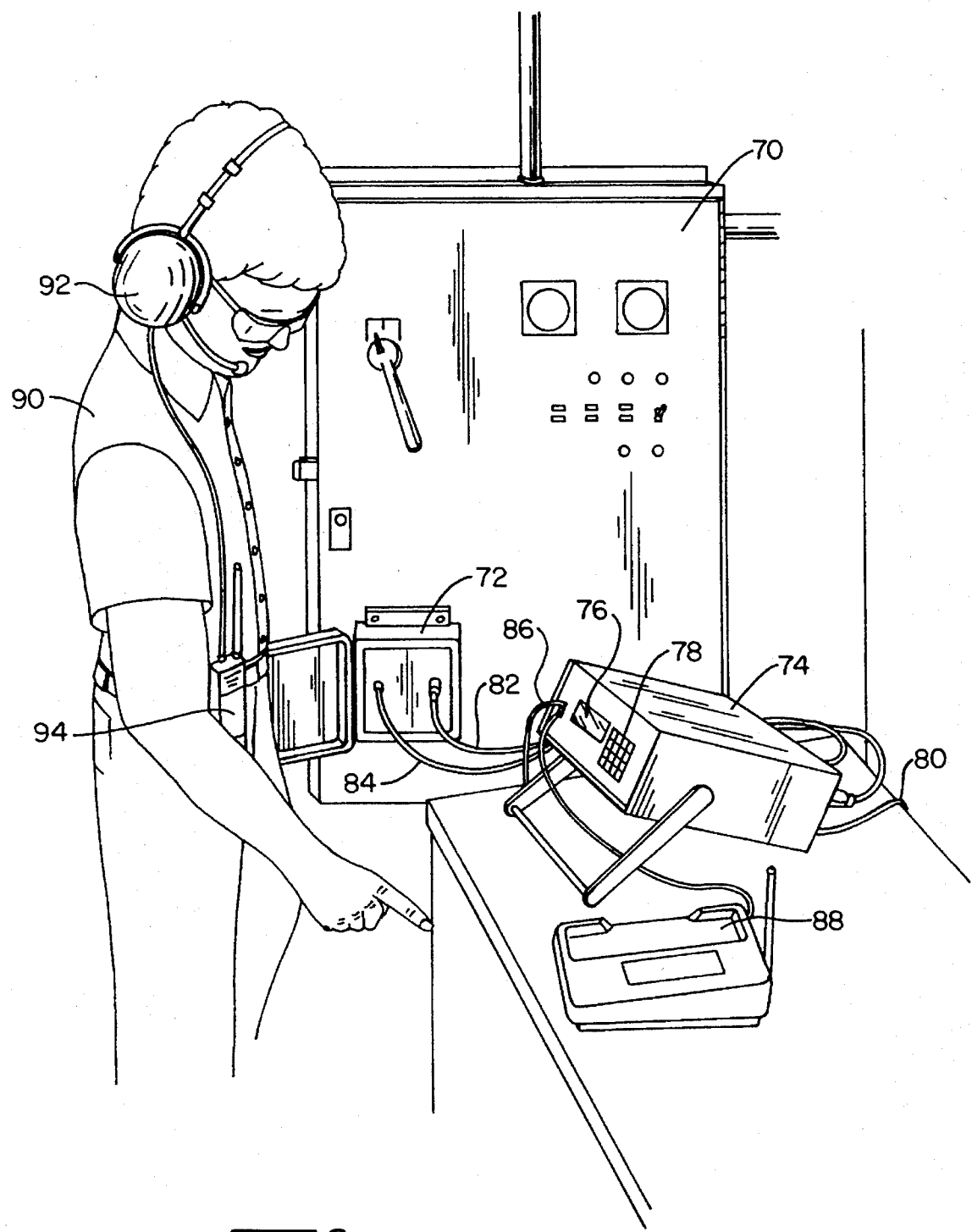
FIG. 2 is a pictorial representation of the system of the invention as employed with a combustion facility safety system.

Referring to FIG. 2, a typical utilization of the system is illustrated. In the figure, the control panel of a combustion installation is represented at 70. Upon this control panel, there is permanently mounted a monitoring interface apparatus 72 which is configured having terminals which may be wired in an overlay manner across the various contacts of the safety system. The configuration of such systems will vary from installation to installation, and, accordingly, through inexpensive and simple jumpering, the apparatus 72 may be configured manually to accommodate essentially all installations. Device 72 includes an identifier component which may be accessed to bring configurations out of memory as well as signal conditioners for use with the typically encountered 115 volts A.C. signals of the safety system.

A portable interrogator assembly is shown at 74 having a local readout present as an LED display 76 and an inputting keypad 78. Device 74 is plugged into a local A.C. outlet as represented by a cord 80 and is connected to the interface assembly 72 via a coupling assembly including digital cable 82 which is coupled to a connector at device 72. Additionally, the analog flame signal is directed to device 74 from the removably connectable analog cable 84. A telephone line is shown at 86 coupled to a telephone connector at the front face of apparatus 74, while a telephone cradle component 88 is coupled to device 74 just below line 86. A line technician is depicted at 90 wearing a headset with microphone combination 92 and remote receiver transmitter 94. Components 92 and 94 may be provided, for example, as a cordless 900 mH telephone with headset. With the arrangement shown, the device 74 may be operated in a data mode providing for data interactive transfer via telephone cable 86 with a remote consulting expert. Additionally, the device may transition to a voice mode for direct voice communcation between that remote expert and the technician 90. Not shown in the figure is a laptop computer which may be coupled to device 74 to afford the technician 90 the same computational program as is available to the expert. The expert need only be called upon at such time as the technician may need additional human intervention. While the interface 72 is relatively inexpensive and is permanently installed, the device 74, for instance which may employ strategy based diagnostic software, may be moved from combustion system to combustion system in a given plant.

Figure 3:
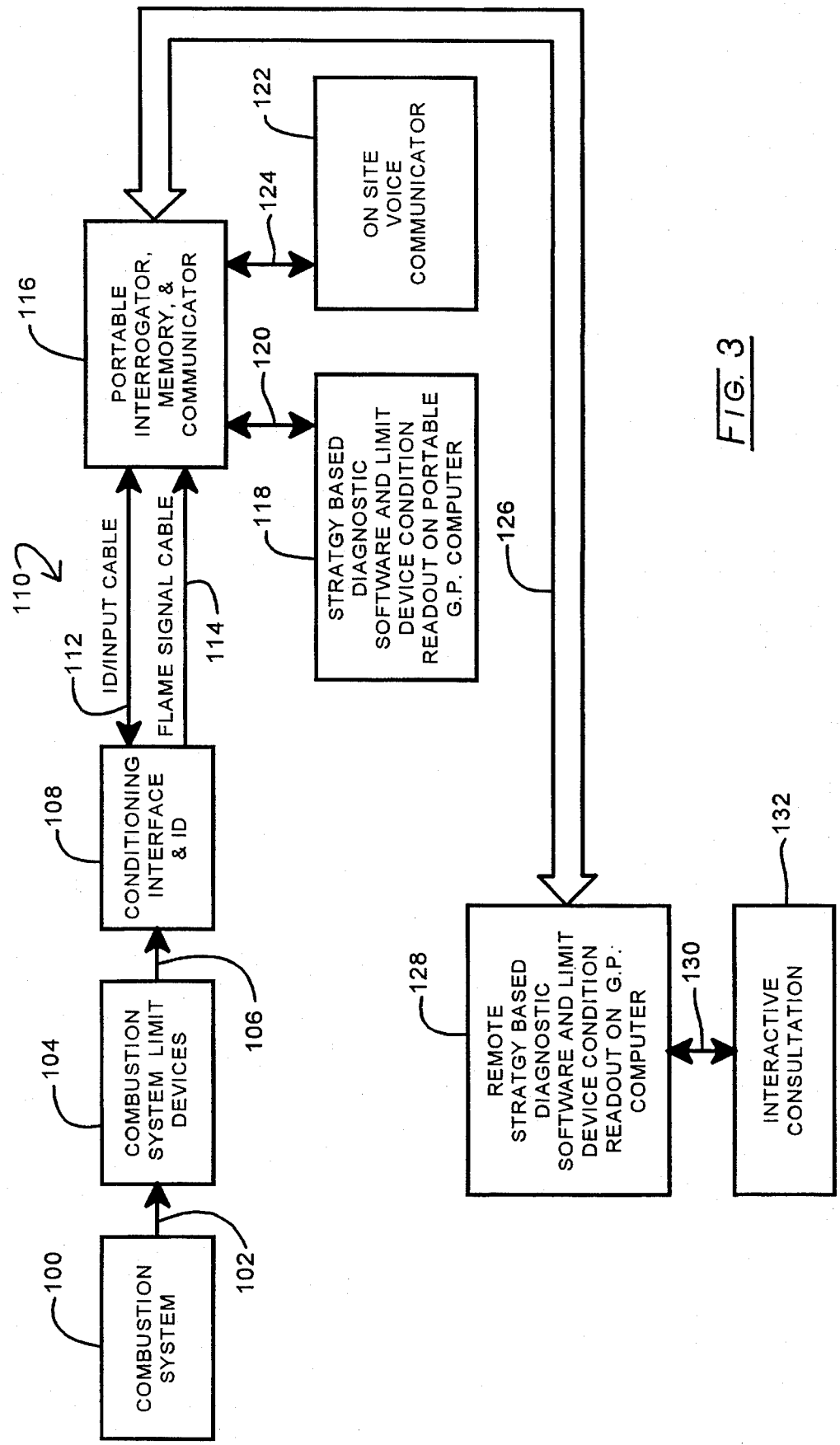
FIG. 3 is a block diagrammatic representation of the system of the invention.

Turning to FIG. 3, a block diagrammatic representation of the interactive system of the invention is portrayed. In the figure, the combustion system is represented at block 100. This system performs in conjunction with combustion system limit devices as described in connection with FIG. 1 and represented by the arrow 102 and block 104. In accordance with the invention, as represented at arrow 106, relatively simple wiring overlays are coupled with the limit devices as represented at block 104 and then to a terminal strip at the interface appratus which carries out signal conditioning and identification as represented at block 108. The cable assembly of the system is represented in general at 110 as including a multiwire cable 112 which develops combustion system identification and contact status information and corresponds with cable 82 of FIG. 2. Additionally, the assembly includes a flame signal cable 114 which conveys an analog signal representing flame status and corresponds with cable 84 shown in FIG. 2. These cables provide for communcation with a portable interrogator assembly with memory and communications as represented at block 116, that block representing the instrument 74 described in FIG. 2. This interrogator assembly 116 may be employed on an interactive basis with a general purpose computer of convenient size, for example those marketed as "laptop" devices. Such on-site small computers may be provided for those technicians who wish to employ strategy based diagnostic software as well as limit device condition readout as represented at block 118 and dual arrow 120. Additionally, as described in FIG. 2 at 88, 92, and 94, on-site voice communication also is provided as represented at block 122 and dual arrow 124. The interactive communication between the interrogator assembly 116 and a general purpose computer remotely located at an expert or consultant's facility is represented by arrow 126 and block 128. At this consultant facility as represented at block 128, the same form of strategy based diagnostic software is available and the limit device condition readout developed at the interrogator assembly 116 is made available at the screen of the general purpose computer. Interactive consultation both with the line technician and the expert is represented at dual arrow 130 and block 132.

Figure 4A:
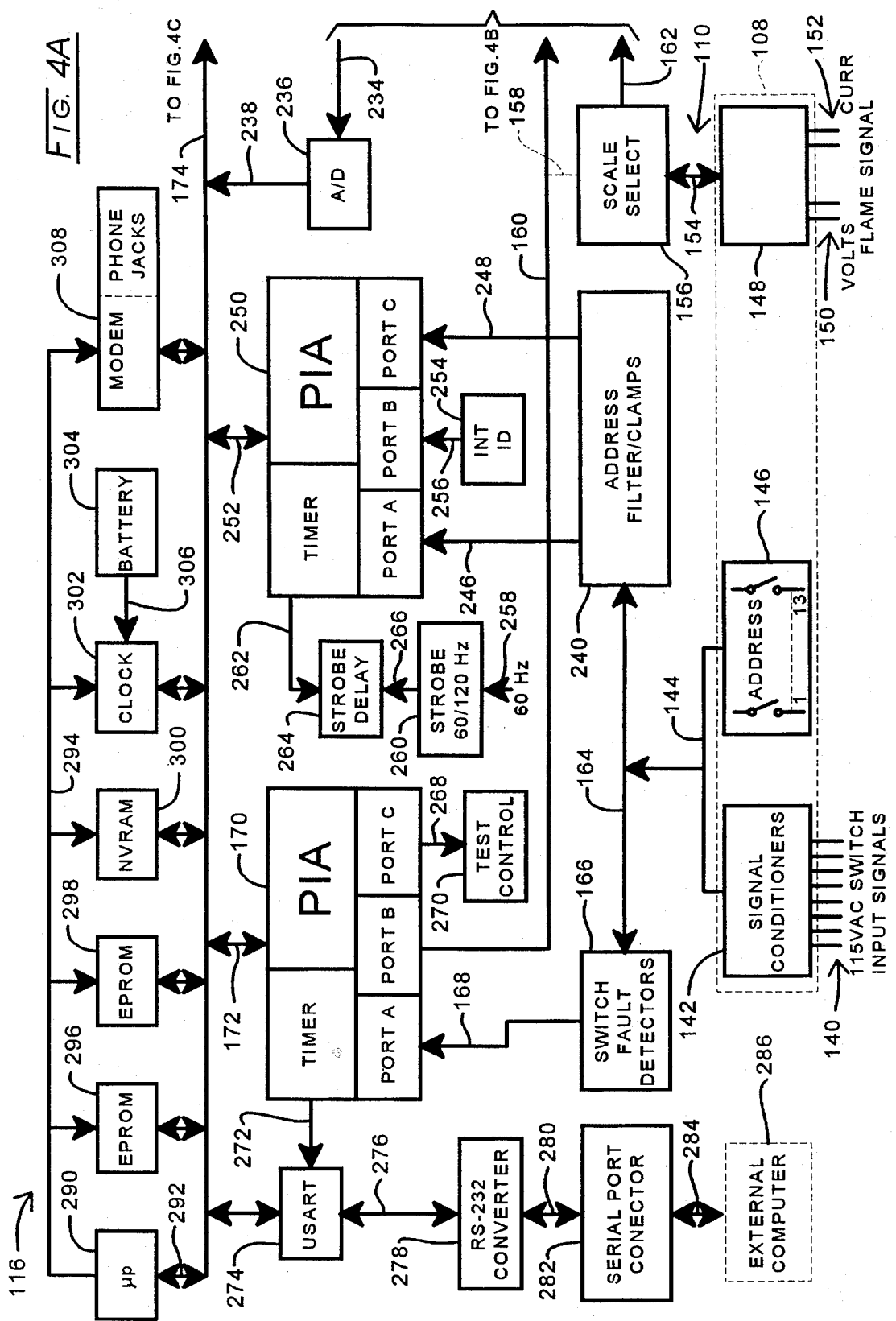
FIGS. 4A–4C combine as labeled thereon to provide a block diagram of the system of the invention at an enhanced level of detail.
Figure 4B:
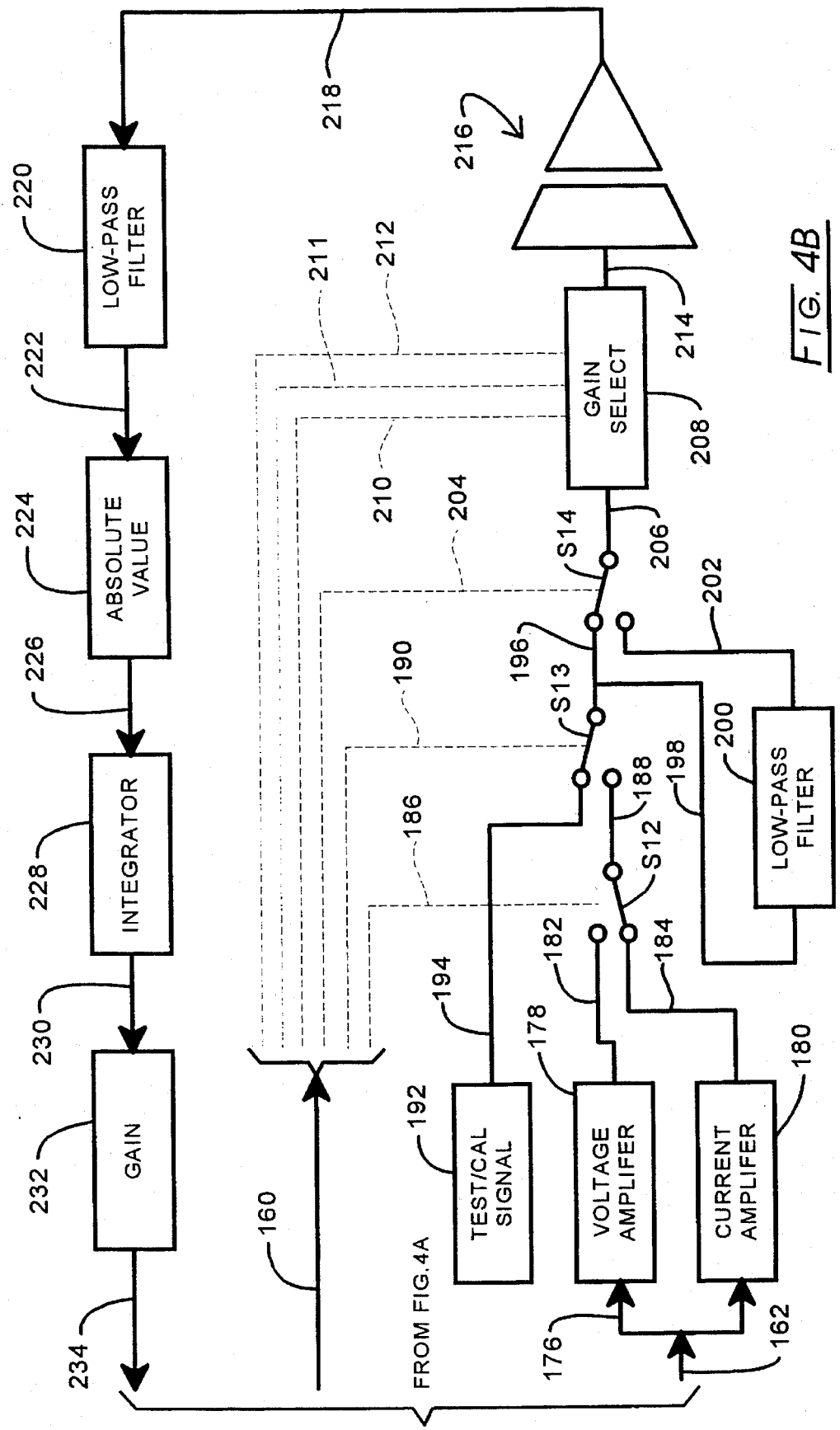
Figure 4C:
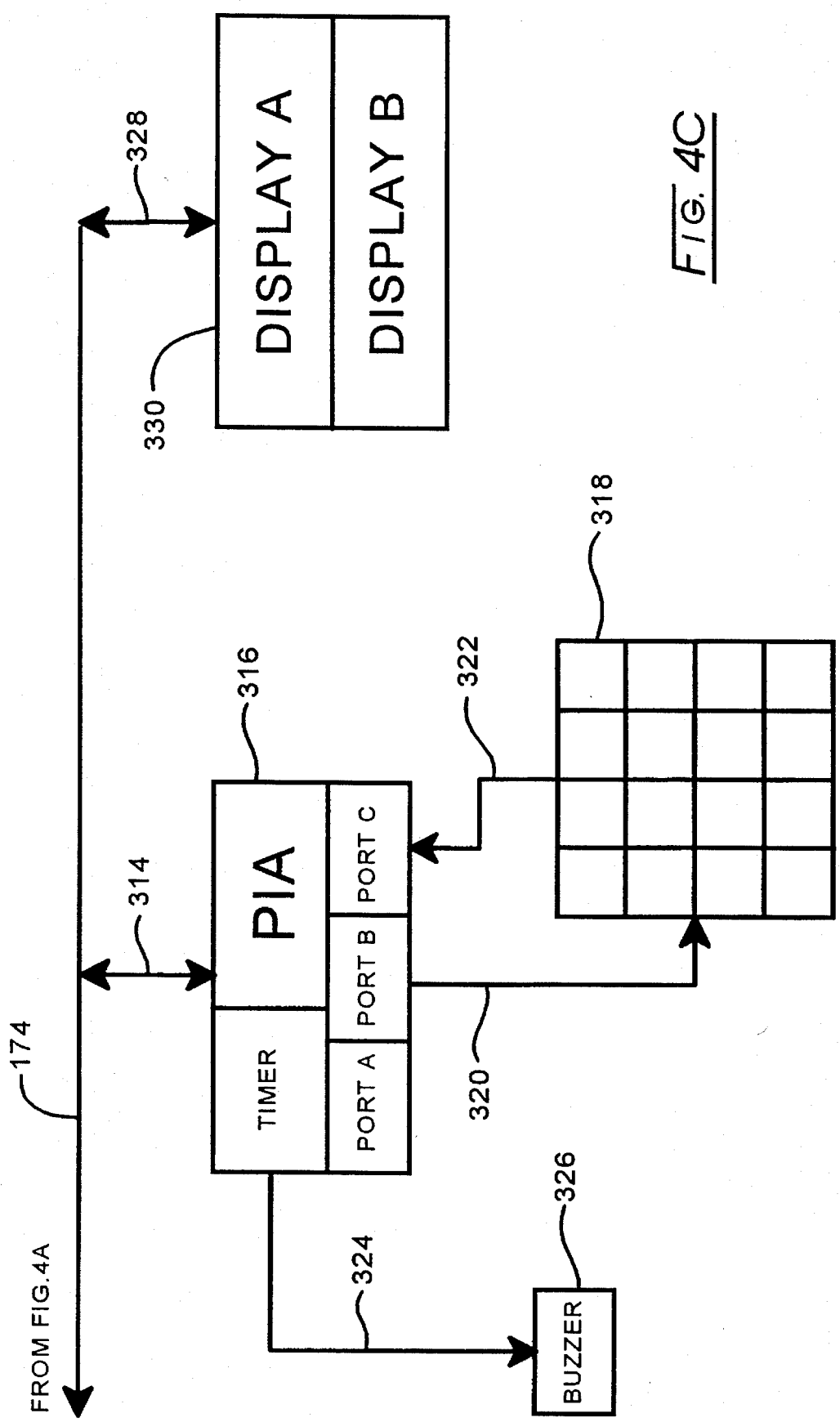

Referring to FIGS. 4A–4C, a block diagrammatic representation of the system of the invention is revealed at a higher level of detail. These figures should be considered together as labeled thereon.

In FIG. 4A, the scaling interface and identification component assembly again is represented by the number 108 in connection with a dashed boundary. This monitoring interface apparatus will include a terminal assembly which is wired to the contacts of the safety system being monitored. As a consequence, a plurality, for example eight switch input signals are derived at the interface device as represented by the input array 140. Note that these are alternating current 115 vac forms of signal. It is important that the line technician as well as consulting expert be apprised of the condition of each of the contacts in the array thereof of the safety system. For example, if contacts 2 and 3 are open, the consultant and technician will wish to know precisely that status as opposed to only knowing the condition of the first contact to open in a sequence of openings. Accordingly, a signal conditioner network is provided within the monitoring interface apparatus as represented at block 142. These signal conditioners may operate either in a shunt fashion wherein a high impedance shunt is positioned across each of the contacts, or in a fashion wherein a very short interval sampling or proving pulse is asserted at the contacts to determine their open or closed circuit condition. The multiple outputs from these signal conditioners are conveyed by the cabling assembly 110 (FIG. 3) and, for the embodiment shown, by cable 82 as represented in FIG. 2 and shown in the present figure at 144. Cable 144 also is coupled to an array of thirteen dip switches as represented at block 146. This identifier component 146 thus provides an adjustable circuit configuration for providing a unique identification condition which will correspond to the combustion facility safety system at hand. The configuration of that safety system along with this unique identification is retained in memory by the portable interrogator assembly. Monitoring interface apparatus 108 additionally functions to convey the analog flame signal as represented at block 148. In general, the analog outputs from the flame rods or the like will be the volts electrical parameter or a current electrical parameter. Thus, four leads are provided for this input as represented, respectively, at dual inputs 150 and 152. The level of either volts or current electrical parameter will depend upon the make of flame relay. For example, some exhibit a 0 to 5 volt output while others exhibit a 0 to 10 volt output and still others a 0 to 20 volts output. Where the electrical parameter is in terms of current, some of these relays will provide an output at a range of 0 to 5 microamperes, while others in a range of 0 to 200 microamperes. The non-volatile memory and processor functions of the interrogator assembly 116 will be aware of the precise electrical parameter by virtue of information provided from the address component 146. This analog signal from the flame relay, which may be d.c. or a.c., is conveyed by flexible cable 154 to the interrogator assembly 116. Cable 154 corresponds with that represented at 84 in FIG. 2.

Now looking to the components of the interrogator assembly 116, analog signal carrying cable 154 is coupled to a scaling function represented at block 156. Scale selection is carried out by a solid-state switching arrangement under the control of a microprocessor as represented by dashed switching control line 158 extending from a bus 160. The scaled output from scaling function 156 is conveyed as represented at line 162 to further signal processing.

Cable assembly component 144 is electrically coupled with the interrogator assembly as represented at arrow 164. Arrow 164 is seen directed to a network of switch fault detectors represented at block 166 which are provided as opto-isolated devices functioning to convert the higher level input contact condition signals to levels appropriate for analysis. The resultant switch contact signals are directed, as represented at arrow 168, to the port A input of a programmable interface adapter (PIA) represented at 170. As represented by arrow 172, PIA 170 is electrically coupled with a data bus 174.

Looking to FIG. 4B, the scaled analog signal at line 162 is seen to be directed, as represented at arrow 176, simultaneously to a voltage amplifier stage represented at block 178 and a current amplifier stage represented at block 180. The outputs of blocks 178 and 180, respectively, are represented at lines 182 and 184, and are selected under program control by switch function identified as S 12. This program control over the switch is represented by dashed line 186 which is associated with bus 160. Actuation of switch S 12 is based upon data established during set-up for any given combustion safety system which is retained along with the identification number of the safety system in non-volatile memory. The selected output from switching function S12 at line 188 is conveyed via a switching function identified at S13 which is, in turn, under program control as represented by dashed line 190. Switching function S13 provides for the insertion of a test or calibration signal from a test signal generating function represented at block 192, providing such signal as represented at line 194. Such an arrangement assures the accuracy of the signal treatment functions of the system to follow. The selected output from switching function S13 at line 196 is directed as represented at line 198 and block 200 to a low pass filtering function having an output at line 202 which is selectable by a next solid-state switching function S14. Switching function S14 is under program control as represented by dashed line 204. The output from switching function S14 at line 206 is directed to a gain select network represented at block 208 which provides a predetermined gain as selected under program control represented at lines 210–212. As before, the gain for a particular uniquely identified safety system is preprogrammed. With the arrangement of the noted program control switching, no set-up is required by the line technician as the interrogator assembly 116 is moved from interface device to interface device. Thus, the diagnostic approach of the invention permits unhindered diagnostic performance with substantial numbers of different safety control configurations which may contain wide varieties of components such as flame relays. The output of the gain select function 208 at line 214 is directed through an isolation amplifier function represented at 216 whereupon the thus-isolated signal is directed as represented at line 218 to a low pass filter stage represented at block 220. From stage 220, as represented at line 222, the signal is directed through an absolute value deriving circuit 224 to accommodate for variations in polarity from signal to signal. The absolute value signal then, as represented at line 226 and block 228, is directed to an integrator stage which provides a D.C. value which, in turn, is directed as represented at line 230 and block 232 to a gain stage. From gain stage 232, as represented at arrow 234, the thus-treated signal is converted to digital form.

Returning to FIG. 4A, arrow 234 reappears as being directed to an analog-to-digital conversion function represented at block 236. The digital data derived at the function 236 then is directed to program control via bus 174 as represented at arrow 238.

Returning to line 164, the unique address data for a given safety system as developed from component 146 is directed via line 164 to an address filter and clamping function represented at block 240. The output from function 240 is directed as represented at arrows 246 and 248 to respective ports A and C of a programmable interface adapter (PIA) 250. PIA 250 is coupled with the data bus 174 as represented by dual arrow 252. In addition to receiving the address data from lines 246 and 248, port B of PIA 250 receives an identification of the interrogator assembly at hand from an identification component provided, for example, as dip switches and represented at block 254. The input of this identification data to port B is represented at 256. This identfication of the interrogator assembly, for example, may be valuable to a remote expert consultant in knowing precisely that interrogator assembly which is being addressed.

The strobe utilized by the interrogator assembly is derived from the utility based power supply, for example at 60 Hz as represented at arrow 258. By detecting the zero cross-over positions of this input, as represented at block 260, either a 60 or 120 Hz strobe may be developed. In order to "move" the position of the strobe with respect to a given half cycle, the timer component of PIA 250 is employed to develop a strobe delay. This is represented in the figure at line 262, block 264, and line 266.

Returning to PIA 170, it may be observed that port C of that device is coupled with a test control function as represented at arrow 268 and block 270. This test control provides the function of determining if all switch fault detectors as described at block 166 are appropriately functioning and also provides a substitute analog test signal for use as described at block 192 in FIG. 4B.

The timer function of PIA 170 is employed to set-up the baud rate for a serial port. In this regard, arrow 272 is seen extending from the timer function to a universal synchronous, asynchronous receiver transmitter (USART) at block 274, the output of which at arrow 276 extends to an RS-232 converter represented at block 278. The latter device at block 278 is coupled in interactive relationship as represented by arrow 280 with a serial port connector represented at block 282. Connector function 282 is employed at the site of any safety system for the purpose of coupling an external general purpose computer such as a laptop computer as described at block 118 in connection with FIG. 3. This association is represented by dual arrow 284 and dashed boundary 286.

FIG. 4A also reveals the conventional components of a microprocessor driven system. In this regard, a microprocessor is represented at block 290 as being coupled with the bus 174 via dual arrows 292 and with an address bus 294.

Also interconnected with the data bus 174 and address bus 294 are erasable, programmable read only memories (EPROM) as represented at blocks 296 and 298, a non-volatile random access memory (NVRAM) as represented at block 300, a calendar clock represented at block 302 in association with a battery represented at block 304 and arrow 306 and, finally, a modem and associated phone jacks represented at block 308.

Referring to FIG. 4C, data bus 174 is seen to extend to communication as represented at dual arrow 314 with a programmable interface adapter (PIA) 316. Device 316 is employed in conjunction with a keypad 318 located at the front of the assembly 116 and the association is represented in FIG. 4C by arrow 320 extending from port B and arrow 322 extending to port C. While a variety of designations may be attributed to the various keys of keypad 318, one function will be for the election of a voice mode or data mode of transmission to the remote expert. Additionally, the device may generate a menu for setting-up a safety system configuration in memory along with numerical inputs. Set-up also can be developed in conjunction with the lap top external computer described at boundary 286 in FIG. 4A. The timer function of PIA 316 is employed, as represented at arrow 324 and block 326 to drive an annunciator or buzzer intended to gain the attention of the line technician. Finally, the data bus 174 is seen to perform in controlling fashion as represented at dual arrow 328 with a display 330 also provided at the front of the assembly 116. In general, two display components herein designated "A" and "B" are utilized. Keypad 318 has been described in FIG. 2 at 78, while display 330 is depicted in that figure at 76.

Figure 5C:
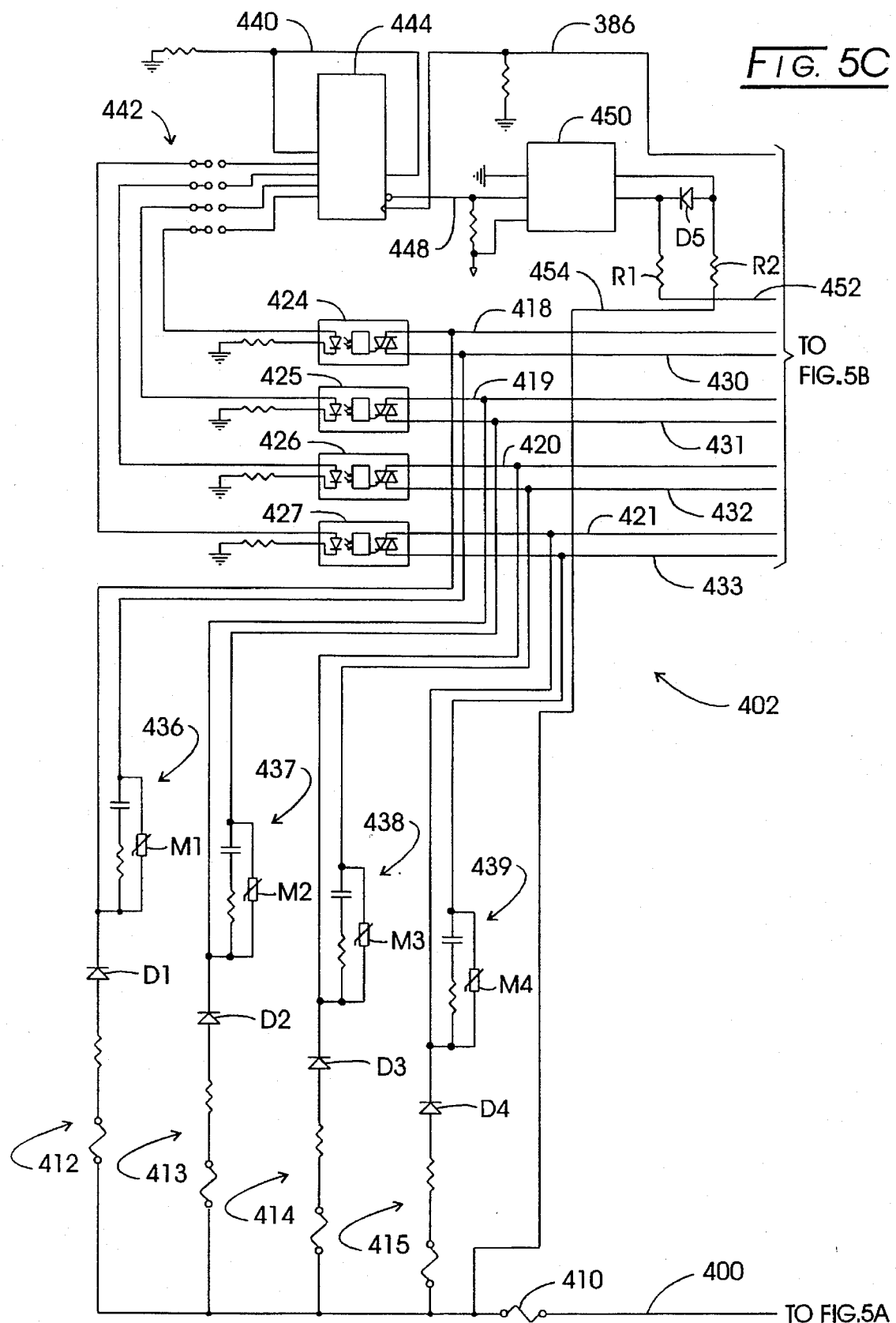

Referring to FIGS. 5A–5C, a more detailed representation of the circuitry associated with the monitoring interface apparatus described at 72 in FIG. 2 and in connection with boundary 108 in FIGS. 3 and 4A, is provided.

Looking to FIG. 5A, the input terminal, cable connectors, identification components, and detector networks of the monitoring interface apparatus are revealed. Installation simplicity for the interface apparatus is manifested by utilization, inter alia, of a 16 input terminal strip represented generally at 336. Of the terminals at array 336, those designated T1 through T4 are employed for the generally encountered first four contacts which are essentially universally coupled in series, for example in the manner of contacts 12', 13', 15', and 16' described in connection with FIG. 1. The remaining contacts are accessed from terminal points T5 through T8 and may have different circuit configurations, for example, parallel or parallel/series. Terminal points T1 through T8 associated with resistor configured detector networks represented, respectively, at 338–345. These networks, each of which is comprised of relatively high impedance components, for example having values of 2K ohms, function to attenuate the 115 VAC supply carried by the safety system contacts at such time as an open contact is detected. In general, these detector networks form a shunt across the contacts of the safety system which conducts current and provides a detector output when any given safety system contact exhibits an open circuit condition. This detector output is directed to one component of a connector assembly, for example a 31 pin connector seen at 348 to which, for example, the cable 82 described in FIG. 2 is coupled. To provide for a manual configuration of networks 342–345 with respect to corresponding contacts T5–T8, a manually interconnectively programmable jumpering arrangement is provided. In this regard, it may be observed that programming line combination commencing with one side of network 342 and ending with network 345 are provided, respectively, at 350–353 and line 354. Looking additionally to FIG. 5B, these programming line pairs are seen to extend to the terminal points of a jumpering terminal array represented generally at 358 and individually at J1–J22. By coupling appropriate jumpers at this array 358, a wide variety of circuit configurations are made available with respect to the detector networks 342–345.

Returning to FIG. 5A, terminal points A1–A6 of the terminal strip or array 336 are seen coupled to the input connectors of the analog component 360 of the connector assembly for the interface apparatus described in FIG. 2 at 72 and in FIG. 3 at 108. The component 360 is that which is connected with cable 84 as shown in FIG. 2. Terminals A1 and A2 are considered, for example, to carry a current designated electrical parameter from a flame monitor and are shown coupled with back-to-back Zener diodes at 362. Similarly, terminals A4 and A5 are, for example, designated to carry voltage categorized electrical parameter signals from a flame monitor and are coupled with back-to-back Zener diodes 364. Diodes pairs 362 and 364 function to protect of the circuit from signal excursions. Terminals A3 and A6 extending from the component 360 function as guards or shielding connectors associated with the cable 84 (FIG. 2). Terminal point L1 of the array 336 is coupled to receive the A.C. power supply of the monitored safety system, for example, developed by control transformers as at 30 described in conjunction with FIG. 1. This input side power line is seen coupled to the initial detector network 338 which, in turn, is coupled to the remaining networks 339–345. Finally, a terminal point designated G1 of the terminal strip or array 336 is seen coupled via line 366 to a corresponding terminal J1 at the jumper terminal array 358. This provides a grounding option to the interface assembly by jumpering with an adjacent grounded terminal.

Returning to FIG. 5A, the identifier component of the monitoring interface apparatus is revealed in general at 370. Component 370 is formed of two binary arrays or dip switch arrays 372 and 374. These arrays 372 and 374 are manually programmable to provide a unique identification condition number for the monitoring interface array. The switching devices are coupled by respective lead arrays 376 and 378 to pin connector 348 of the connector assembly, and are supplied for example +5 v, from an associated interrogator assembly as described at 74 in FIG. 2 and 116 in FIG. 3 via lines 380 and 382. A capacitor array shown generally at 384 provides for filtering of this supply. One additional line 386 is shown coupled to one component of the switch array 374. This line is employed to provide processor control to another component of the contact condition detector arrangement of the invention.

The detector network of the invention which determines which of the safety system contacts are in an open circuit condition and which are in a closed circuit condition can be configured as a high impedance shunt arrangement or may utilize a short duration sampling or proofing periodic pulse arrangement, or may be configured with a combination of each of those approaches. The embodiments of FIG. 5 may be seen to employ the latter arrangement.

Figure 6:
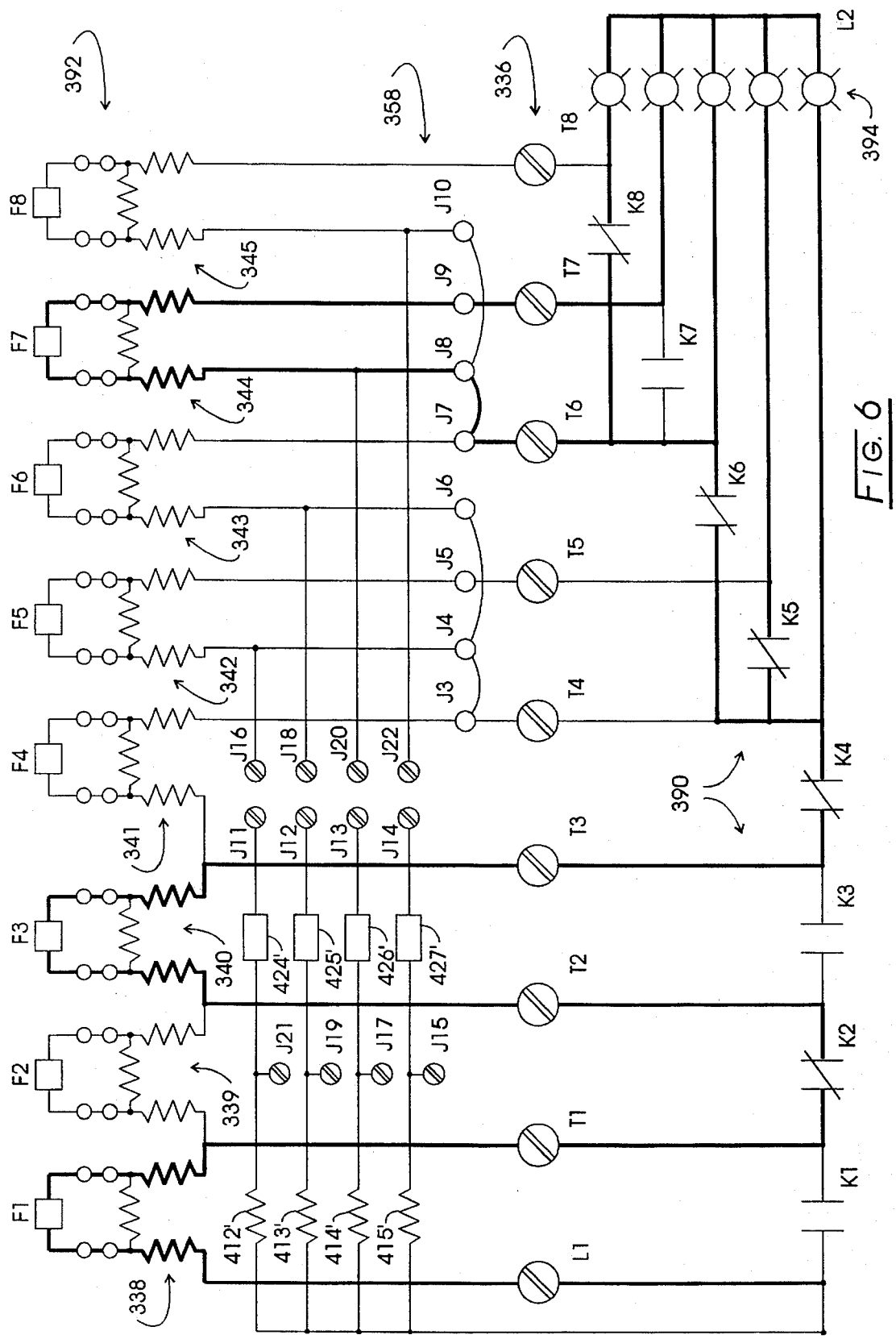
FIG. 6 is a schematic representation of the monitoring interface apparatus of FIGS. 5A–5C as associated with the contacts of a combustion system, the figure revealing a current flow pattern.

In order to describe the high impedance shunt configuration, FIG. 6 is provided showing shunt current flows and detected contact conditions or interface outputs. In general, the first four safety system contacts within system, in the figure designated K1–K4 will be coupled in series as discussed in connection with FIG. 1. For the demonstration of FIG. 6, subsequent contacts identified as K5 and K6 are arranged in parallel as are the next two contacts identified as K7 and K8. The contact arrays K1–K8 are shown as an array at 390. Correspondingly, the terminals identified as L1 and T1–T8 as described in conjunction with FIG. 5A again are represented in general as an array at 336. For the shunting approach at hand, jumper terminal points J3–J10 as shown in FIG. 5B again are represented in general at 358. Above the foregoing components, detector networks 338–345 again are represented in general, but utilizing representations of only three resistors for each. Above these detector networks optically isolating detectors F1–F8 are represented in general at 392 and corresponding with block 166 of FIG. 4A. Detectors 392 are mounted within the portable interrogator assembly 74 and are described in detail later. Their electrical connection with networks 338–345 is via the earlier-noted cable 82 and connector 348 as shown in FIG. 5A. In the demonstration of FIG. 6, contacts K1, K3, and K7 are depicted as being in an open circuit condition, while contacts K2, K4, K5, K6, and K8 are represented with a slash as being in a closed circuit condition. With the arrangement shown, and utilizing the power supply L1 of that terminal within connector terminal array 336, a current path may be traced as shown in heavy lines. In this regard, because contact K1 is open circuited, current will flow from terminal L1 through network 338 and component F1, then through terminal T1 and closed circuit contact K2, thence, through detector network 340 and detector F3, inasmuch as contact K3 is in an open circuit condition. From detector F3, the current passes through closed circuit condition contact K4 through any given load component as represented generally as the load array 394 and to a return designated L2. Current also will pass through closed circuit condition contact K5 and through the array 394 as well as through closed circuit condition contact K6. However, because contact K7 is in an open circuit condition, current will flow across upper connections J7 and J8 to detector network 344 and through detector F7, thence through terminal T7 and one load component of the array 394 to return. Because contact component K8 is in a closed circuit condition, current also will flow from terminal T6 therethrough and thence through a load component of array 394 to a return. Accordingly, the circuit closure status of each of the safety system contacts may be identified for diagnostic purposes with the instant approach.

Returning to FIG. 5A, the A.C. power source input from terminal L1 of line 336 is seen to extend to line 400. Looking additionally to FIG. 5C, line 400 reappears as extending to a detector network represented generally at 402 which performs in a mode wherein the earlier-noted proving or sampling signal of limited duration is periodically asserted to determine the closed or open circuit condition of those safety system contacts associated with, for example, contacts K5–K8 as described in conjunction with FIG. 6 and as configured by jumper terminals J3–J10 of the terminal array 358. The proofing or sampling approach provided by network 402 accommodates the problem of overattenuation of the shunting signal where, for example, an excessive number of series coupled contacts K1–K4 are opened.

The A.C. signal, typically at 115 v at line 400 is fused at a fuse 410 and introduced to four attenuating networks 412–415, each formed in sequence as including a fuse, a resistor, the value of which may be varied to suit the desires of the user, and a diode. These networks connect, respectively, with lines 418–421 extending to one output side of respective opto-couplers 424–427. Connected across the outputs of devices 424–427 at respective lines 430–433 are respective snubber networks 436–439. Performing in conventional fashion, the snubber networks 436–439 protect the circuitry from inductive kick-backs. To enhance the performance of snubber networks 436–439, metal oxide varristers (MOV) are also incorporated as illustrated. With the arrangement shown, when devices 424–427 are turned on, the half cycle developed from attenuating networks 412–415 is conveyed at their outputs. Devices 424–427 may be provided, for example, as type PM1206 AC solid-state switches marketed by C. P. Clare Corp. These switches 424–427 are turned on for a clock interval by signals asserted in progressive sequence along line array 442 in consequence of the clocking of a decade counter 444. Decade counter 444 is clocked under program control of the interrogator assembly 74 (116) from line 386 as associated with connector component 348 (FIG. 5A). Counter 444 may be provided, for example, as a type MC14017B marketed by Motorola Corp. The Q5 terminal of device 444 is coupled to its reset input and to ground at line 446 while the line array 442 coupled thereto respectively is connected with its Q4–Q1 output terminals. To provide synchronization of the performance of counter 444, its enable terminal is coupled via line 448 to the V0 output of a split-Darlington opto-coupler 450. The + and − input terminals of device 450 are driven from the on-site a.c. power supply (source) as is derived from lines 452 and 454 carrying appropriate current limiting resistors. Device 450 is triggered at source zero cross-over and provides an enablement to counter 444 at alternate half cycles of the supply. Thus, the output of opto-coupled devices 424–427 represent a clock defined interval of spaced-apart half cycles. These proving or sampling signals are directed to the second four detector networks 342–345 as described in FIG. 5A as manually programmed or configured from the jumper terminal array 358. Each injected sampling or proving pulse is of such short duration and of such limited application as to have no detrimental effect on any downstream control components of the safety system being interrogated.

Figure 7:
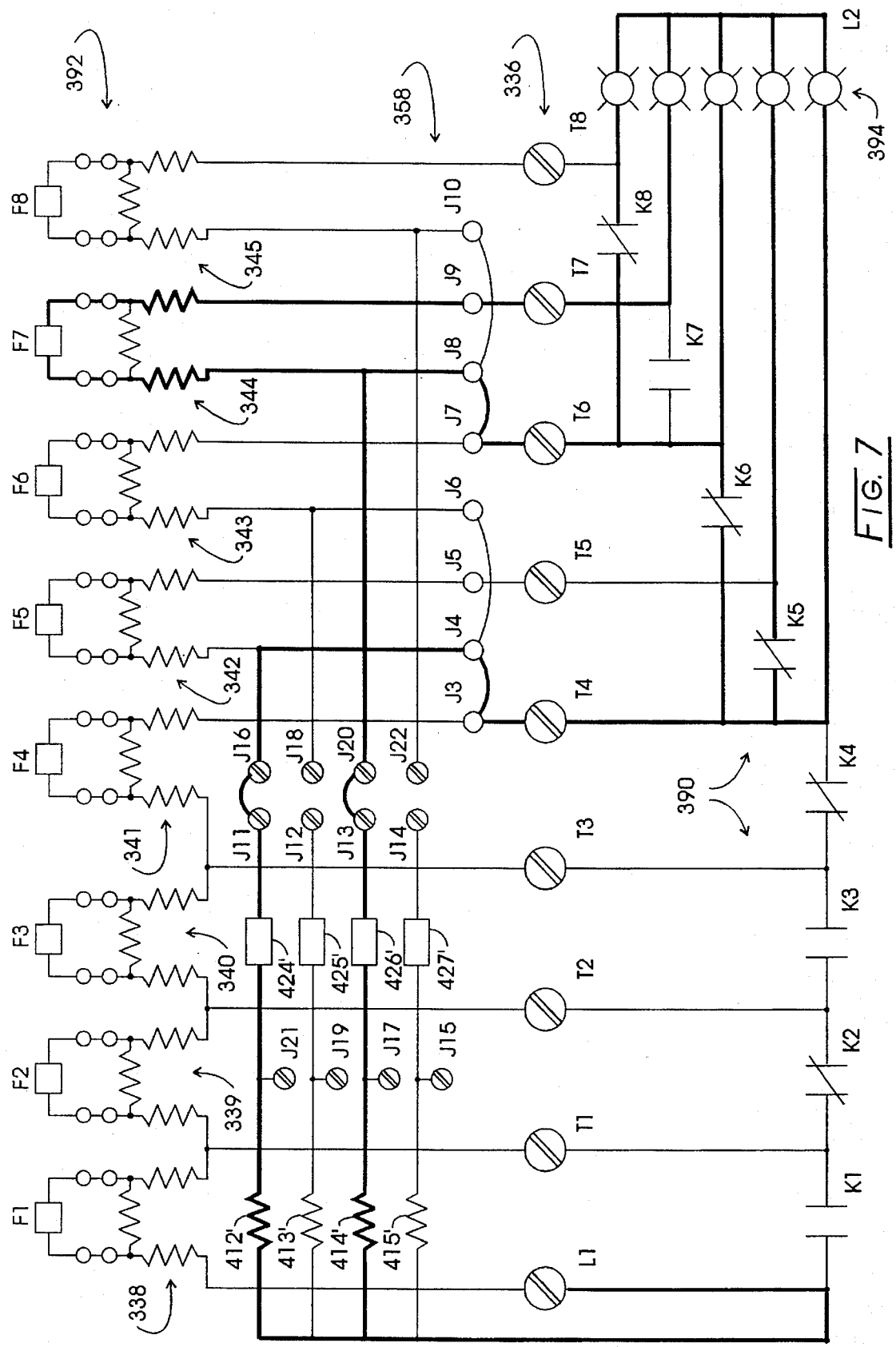
FIG. 7 is another schematic representation of the monitoring interface apparatus of FIGS. 5A–5C as associated with the contacts of a combustion system, the figure revealing a current flow pattern.

Referring to FIG. 7, a current flow diagram is presented which is identical to that described in connection with FIG. 6 with the exception that the above-described proving or sampling pulse contact interrogation approach is demonstrated. As before, the paths of current flow are represented in heavier lines. In the figure, attenuating networks 412–415 are represented by resistor symbols and are similarly identified but in primed fashion. Similarly, the solid-state switches 424–427 are schematically portrayed in block form with the same but primed numeration. As in the case of FIG. 6, contacts K1–K4 are monitored by the earlier-described shunt approach such that a signal is developed at detectors F1 and F3 indicating the open circuit conditions of contacts K1 and K3. However, the associated lines are not made heavier in the interest of clarity. The figure shows that when switch 424' is closed for a clock interval, then current will flow in the paths shown activating detector F7 to represent the open circuit condition of contact K7. Similarly, as switch 426' is closed for a clocking interval, the same current path flows will be developed.

Figure 8A:
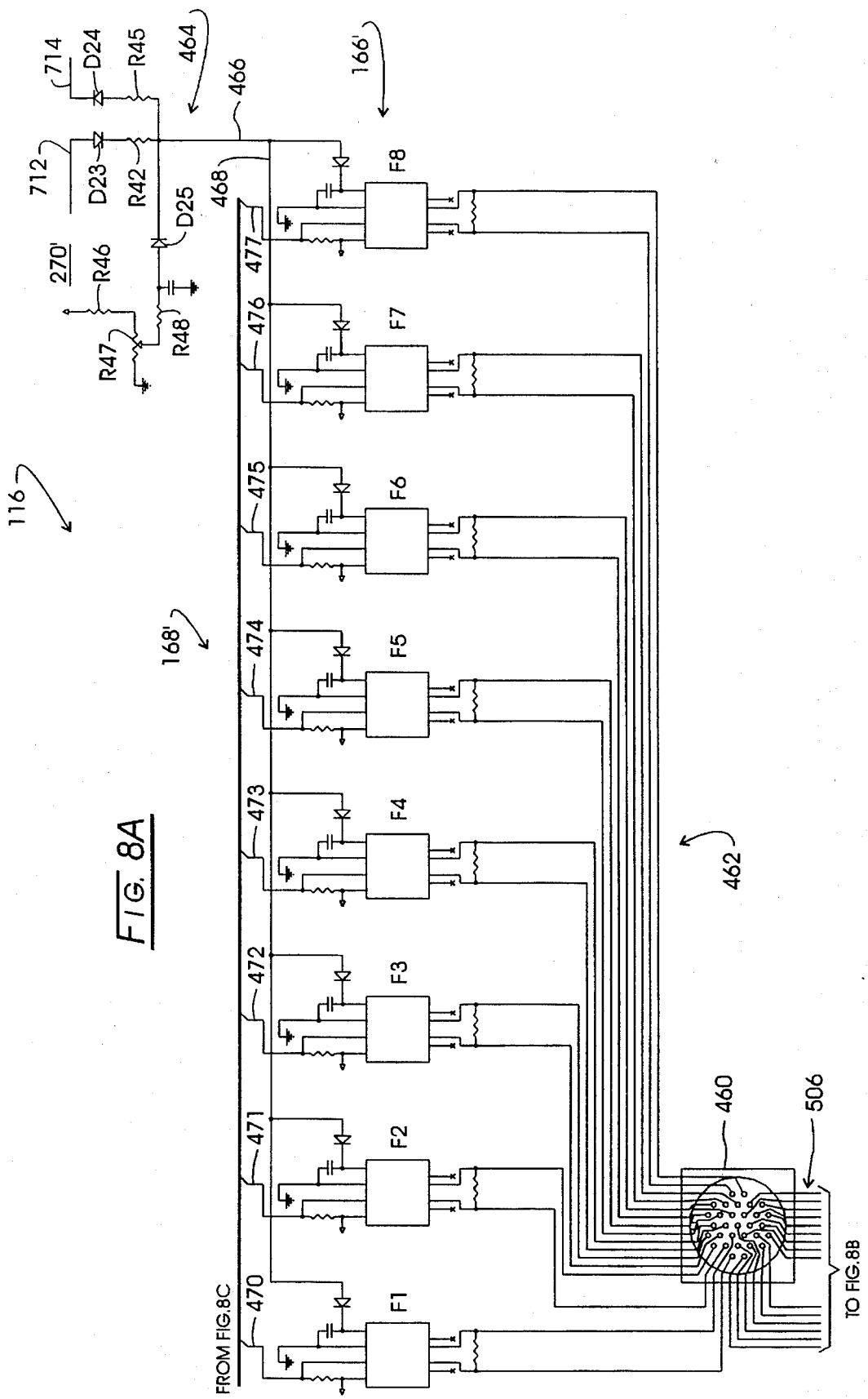
FIGS. 8A–8C combine as labeled thereon to provide an electrical schematic diagram of address deriving networks and switch fault detection networks employed with the interrogator assembly of the system of the invention.
Figure 8B:
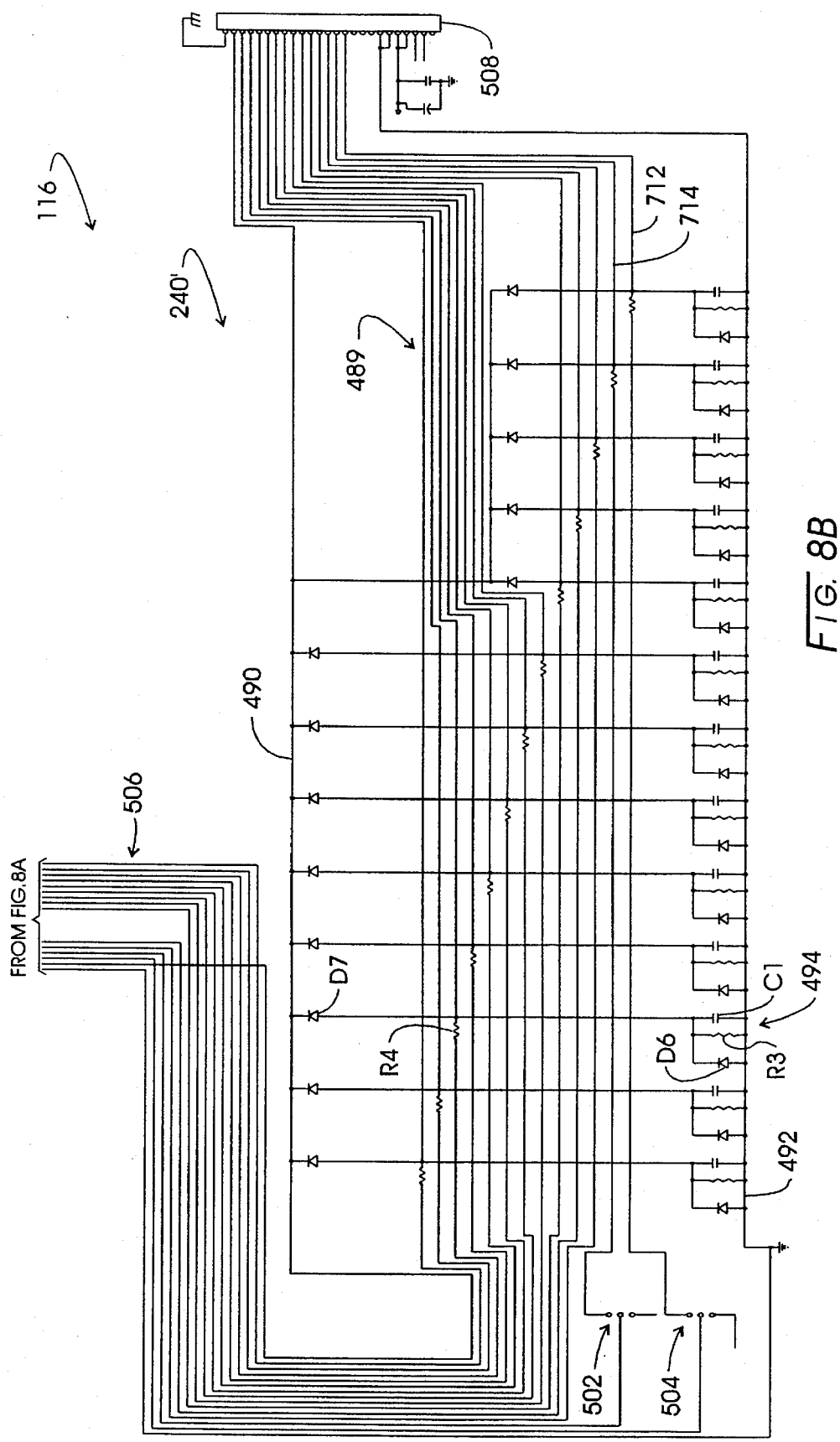
Figure 8C:
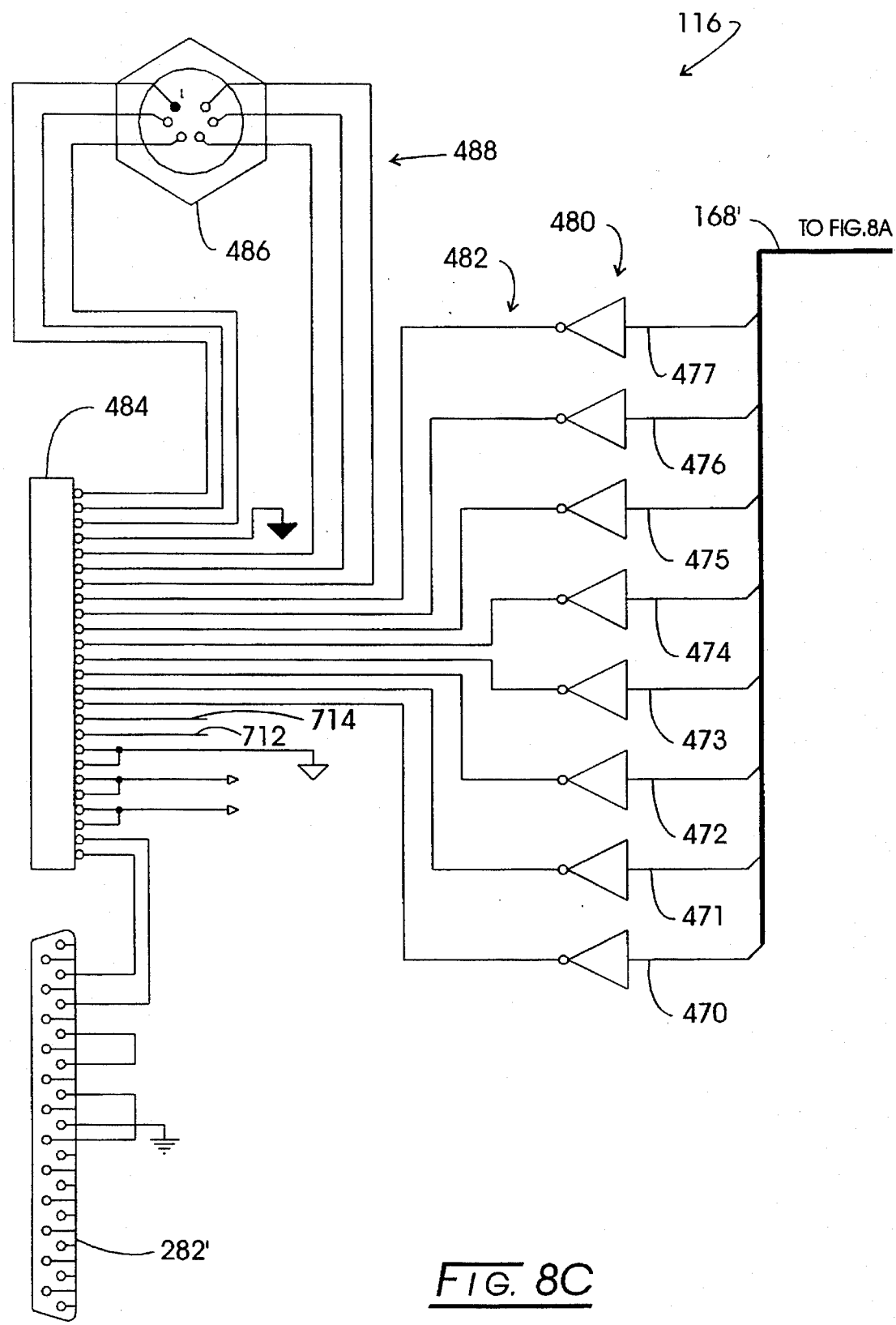

Referring to FIGS. 8A–8C, the input components of the interrogator assembly are revealed at an enhanced level of detail. These figures should be considered in a mutual arrangement as labeled. In FIG. 8A, a 31 pin connector 460 is illustrated. Connector 460 corresponds with that described at 348 in FIG. 5B in that it is associated with connector 348 via earlier-described cable 82 (FIG. 2). With the coupling shown in FIG. 2, connector 460 distributes the signals developed from detector networks 338–345 and distributes them via lead array 462 to the inputs of opto-coupling devices F1–F8 which have been referred to earlier in connection with FIGS. 6 and 7. Recalling that the input to these devices is of an alternating current nature, they will function to provide an optically isolated AC line-to-logic interface. They may be provided, for example, as type MID400 AC line monitor logic-out devices marketed by Quality Technologies, Inc. The output sides of devices F1–F8 are supplied Vcc +5 v from the power supply of the assembly through network 464 and lines 466 and 468. When an a.c. detector current is applied to their inputs from the above-noted detector networks, then a logic high output will be provided at an associated output line as seen, respectively, at 470–477. These outputs are carried to a programmable interface adapter earlier-described at 170 by bus or line grouping 168 as described in connection with FIG. 4A, which numeration reappears in the instant figure in primed fashion.

Looking addtionally to FIG. 8C, line grouping 168' is seen to comprise output lines 470–477 which exhibit a logic high condition to indicate an open circuit condition of a safety system contact. These lines are directed through an array of buffers represented in general at 480 for conveyance via line array 482 to port A of a programmable interface adapter earlier described at 170 in FIG. 4A. Line array 482 extends to a connector for signal transmission for the components of the interrogator assembly circuitry via a connector as represented at 484. Connector 484 also is connected with a serial port connector as described in conjunction with block 282 in FIG. 4A and represented by the same numeration in primed fashion in the instant figure. FIG. 8C additionally shows a six pin connector 486 which receives the analog signals via cable component 84 (FIG. 2) from connector 360 described in connection with FIG. 5A. The six line array from connector 486 is seen to be connected to connector 484 for conveyance to a scale select function described in FIG. 4A in connection with block 156.

Referring to FIG. 8B, the filter and clamping network associated with the address components 370 as described in FIG. 4A at block 240 is revealed at an enhanced level of detail. The identifying numeration 240 reappears in the figure in primed fashion. Network 240' provides signal conditioning and noise filtering for each of 13 lines shown within an array 489 and extending between a +5 v instrument power line 490 and instrument ground 492. The configuration for each line is identical, for example, the filter being comprised of a resistor and capacitor, one of which is revealed as an example at 494 in conjunction with resistor R3 and capacitor C1. Clamps to the +5 v power line 490 as well as to ground are provided, respectively, by diodes as at D6 and D7. Additionally, a resistor as at R4 is incorporated within each line. Two lines of the array 488 may be programmed to carry processor-based control signals by appropriate jumpering. Such jumpering terminals are represented at 502 and 504. The entire line compilation including array 488 and instrument power lines 490 and 492 are shown in general at 506. This compilation 506 extends to connector 460 in FIG. 8A. The opposite side of these lines is shown coupled to a connector 508 from which the signals are directed to ports A and C of PIA 250 as described in conjunction with FIG. 4A.

The voltage categorized analog signals and current categorized analog signals directed from line array 488 to connector 484 are, in turn, conveyed to two distinct scaling and initial gain stages. Scaling and gain treatment has been described in connection with FIG. 4A at blocks 156, 178, and 180. These features of the interrogator assembly which have been described in general in connection with FIGS. 4A and 4B, are illustrated in detail in FIGS. 9A–9E. The subject figures should be considered in a physical arrangement represented by the labeling thereon.

Figure 9A:
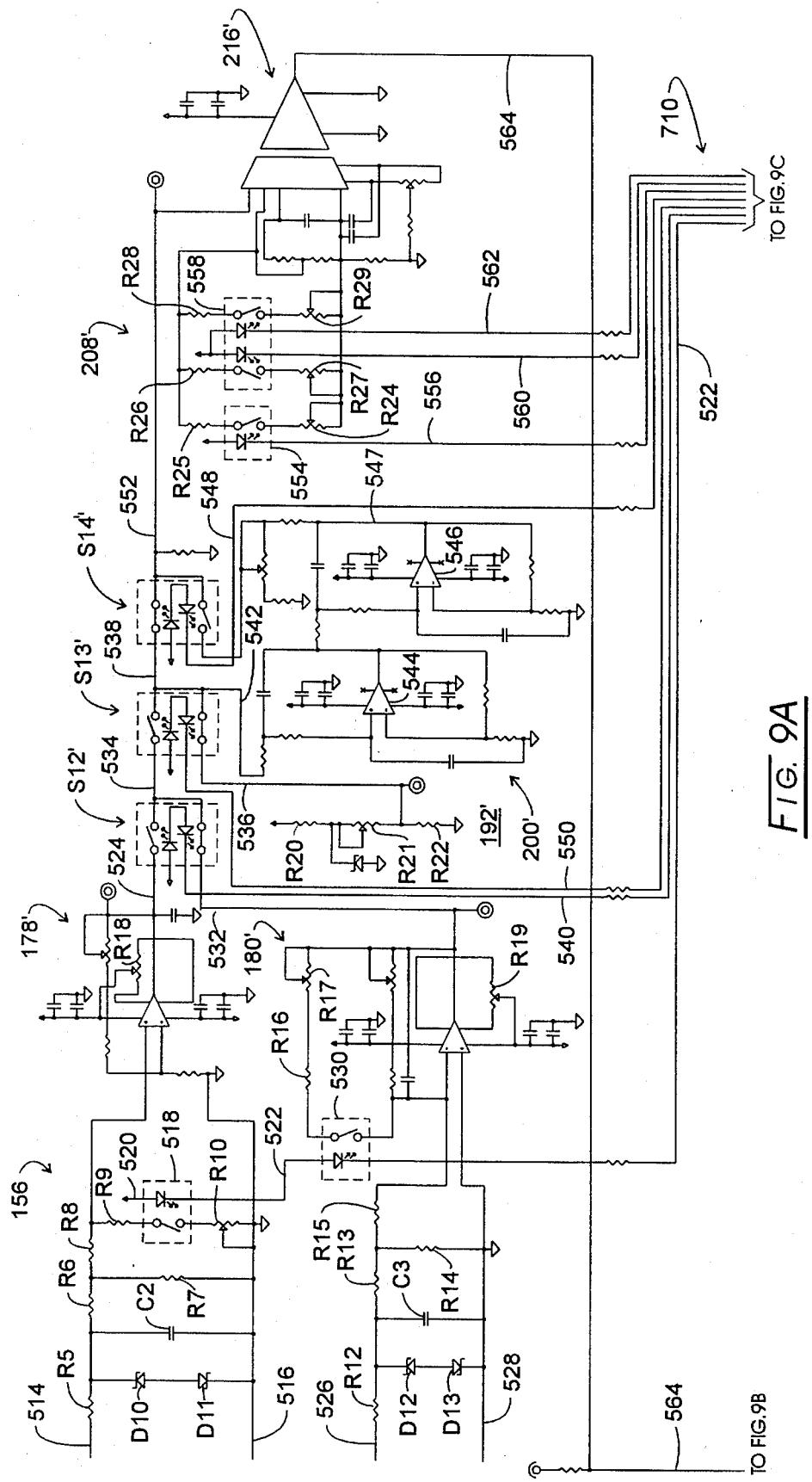
FIGS. 9A–9E combine as labeled thereon to provide an electrical schematic drawing of the signal treatment, program control, and communication features of the interrogator assembly of the system of the invention.

Looking to FIG. 9A, the voltage channel analog input is presented at lines 514 and 516. These lines are protected from spurious noise by back-to-back coupled Zener dimes D10 and D11. Additionally, the signal is filtered by the combination of resistor R5 and capacitor C2. Next, basic scaling of the signal is provided by resistors R6–R8. The amount of scaling may be adjusted under processor control by the closure of a solid-state opto-relay 518. Device 518 is coupled to Vcc at line 520 and is actuated under processor control via line 522. A resultant scaled signal is then directed to a voltage amplifier described earlier at 178 in FIG. 4B and represented by the same numeration in primed fashion in the instant figure. The output of the amplifier 178' is provided at line 524. The operational amplifier employed with stage 178' may be provided, for example, as a type AD546 Monolithic electrometer operational amplifier marketed by Analog Devices, while opto-relay 518 may be provided as a type AQV210 marketed by Matsushita.

In similar fashion, the current electrical parameter channel is present at lines 526 and 528. Protection against spurious noise is provided by two back-to-back coupled Zener diodes D12 and D13, and the a.c. current signal is filtered by a filter comprised of resistor R12 and capacitor C3. Scaling is carried out by resistor combination R13, R14, and R15, and the resultant filtered and scaled signal is directed to current amplifier stage 180'. The gain of stage 180' may be adjusted or the signal scaled by the actuation of a solid-state opto-relay 530 functioning to insert resistors R16 and R17 into the stage feedback path. Device 530 is actuated from line 522 simultaneously with device 518 and may be of the same type relay. Stage 178' may be zero adjusted at potentiometer R18, while a corresponding zero adjustment for stage 180' may be provided in conjunction with potentiometer R19. The output of stage 180' is present at line 532 as a voltage value which is directed to the normally closed switching input of solid-stage opto-relay S12'. Relay S12' corresponds with switch S12 described in conjunction with FIG. 4B. Correspondingly, the voltage channel output 524 is directed to the normally opened side of device S12'. Device S12' may, for example, be provided as a type AQW614 relay marketed by Aromat. As described in connection with switch S12 in FIG. 4B, that device elects either the voltage electrical parameter channel or the current electrical parameter channel of the flame monitoring signal and the selected output at line 534 is directed to a dual input relay S13' which, as described in connection with switch symbol S13 in FIG. 4B determines whether a test signal input should be provided to the system. This test signal input is derived from earlier-described test signal network 192 which is identified in the present figure in primed fashion and is provided as a voltage divider resistor chain comprised of resistors R20, R21, and R22. The test signal output of test function 192' is presented from line 536 to the normally closed input of opto-relay S13', while line 534 selecting the flame relay signal is asserted at the normally open side of relay S13'. The thus-elected test signal or flame signal is provided at line 538. Relay S13' is actuated under program control as described in connection with FIG. 4B at line 190 via line 550.

Output line 538 carrying a test for analog signal is coupled via line 542 to a low pass filter stage 200' corresponding with block 200 in FIG. 4B. Stage 200' is comprised of two operational amplifiers 544 and 546, and provides an output at line 547. Line 547 is directed to the normally open side of an opto-relay S14' corresponding with switch S14 in FIG. 4B. Output line 538 from switching relay S13' is directed to the normally closed side of function S14' (corresponding with switch symbol S14 in FIG. 4B) the election to insert the low pass filter stage 200' is made under program control by actuation of the switch S13' from line 550. Line 550 corresponds with line 190 described in conjunction with FIG. 4B. The output of switching relay S14' is provided at line 552 which is directed to one input of an isolation amplifier 216' corresponding with the amplifier stage 216 described in connection with FIG. 4B. Device 216' may be provided, for example, as a type AD202 general purpose, two-port, transformer-coupled isolation amplifier marketed by Analog Devices. The gain of this amplifier stage 216' is adjusted under program control as described in FIG. 4B in connection with block 208 and lines 210–212. That stage reappears in FIG. 9A under the same primed numeration. A variety of separate gains can be established for amplification stage 216' under program control associated with the unique identification number of the combustion system being interrogated. One gain-defining resistor combination which can be switched into the gain configuration of the amplifier is present at resistors R25 and R24 which are inserted to define gain by closure of normally open opto-relay 554 by control asserted from line 556. In similar fashion, resistors R26 and R27 can be switched to the gain defining configuration by actuation of one side of normally open opto-relay switch 558 in consequence of a control signal asserted from the process control via line 560. Finally, resistors R28 and R29 may be incorporated within the gain defining architecture by closure of the second component of normally open opto-relay switch 558 by signal asserted from line 562. Thus, by virtue of the memory retention of the unique configuration of any given safety system, a program identification of the unique identifying number of that system automatically will configure the interrogator assembly 116 for use by the line technician and/or consultant expert.

The output of amplifier 216' is provided at line 564. Line 564 extends to FIG. 9B and a low pass filter described in FIG. 4B at block 220 and represented in the instant figure at 220'. This filter is comprised of resistor R30 and capacitor C4. The low pass filtering of the signal treatment thus far described is for the purpose of accommodating ripple phenomena and the like. The signal derived from a given flame monitoring device may be either d.c. or a.c. Experience has shown that such low pass filtering and control over spurious signals is well called for. The signal is then passed to an operational amplifier 566 having an output at line 568. Coupled to line 568 is a zeroing network 570 which is adjustable to eliminate any offset. The signal then is directed to an absolute value circuit 224' as described in connection with FIG. 4B at 224. This network 224' includes a full wave rectifier comprised of diodes D14 and D 15. The absolute value circuit is seen additionally to incorporate operational amplifiers 572 and 574 and the resultant d.c. level signal is provided at ouput line 576. The signal at line 576 is integrated by an integration stage including resistors R31–R33 and capacitor C5, which the time constant for network 228' may be adjusted by opening the normally closed contact side of an opto relay 580 coupled to line 582. The opposite side of relay 580 functions to insert a resistor R34 within stage 232' to provide a gain adjustment. Control over device 580 is developed from the program control and is asserted via line 584. Device 580 may, for example, be a type AQW614 as described above. The output of gain adjust network 232' at line 586 is directed to the analog input of an analog-to-digital converter 590. Device 590 may, for example, be present as a type MP7574 eight-bit analog-to-digital converter marketed by Micro Power Systems, Inc. A reference voltage input to device 590 is provided at line 592 and is derived from a voltage regulator 594. Device 594 may, for example, be provided as a precision regulator marketed by Analog Devices, Inc. The clock input to device 590 is coupled to lines 596 and 598, the latter line incorporating resistor R35 and capacitor C6. An eight-bit binary output is provided by device 590 at line array 600 and microprocessor-based control to the device is provided as a chip select input at line 602 as well as a read input at line 604. Device 590 provides a busy output signal at line 606. The converter network incorporating the above-described device 590 as well a converter 594 has been described in conjunction with FIG. 4A at block 236. That numeration reappears in the instant figure in primed fashion.

The eight-bit digital output of device 590 is directed to a databus 610 described in general at 174 in FIGS. 4A and 4C. Looking to FIG. 9E, databus 610, inter alia, carrying the digital output of A-to-D converter 590 delivers such data via lead array 612 to a microprocessor 614 at the AD0–AD7 input terminals. Device 614 is described earlier in conjunction with FIG. 4A at 290 and that numeration also appears in primed fashion in the instant figure. Microprocessor 614 may be provided, for example, as a type 8085AH eight-bit HMOS microprocessor marketed by Intel Corporation. The device uses a multiplexed databus, the address being split between the eight-bit address bus and eight-bit databus 610. It receives a strobe input at its RST terminal from line 616 and a timer input at another RST terminal from line 618. Start-up reset network of conventional design is shown, in general, at 619 which is coupled to the reset in terminal (RST-IN) of the microprocessor. The ready terminal of device 614 is coupled via earlier-described line 606 to the busy terminal of A-to-D converter 590 (FIG. 9C) while its address latch enable output is seen coupled via lines 620 and 622 to an octal address latch 624. Device 624 performs the function of latching the lower eight bits of 16-bit defined addresses and is coupled in eight-bit fashion between buses 610 and 626. The device may be provided, for example, as a type 74LS 373. Microprocessor 614 also performs in conjunction with two three-line-to-eight-line decoders as at 628 and 630. The eight-bit outputs of these devices as seen, respectively at 632 and 634 in general provide chip election or selection functions in conjunction with the control components. In this regard, the chip enable terminals of two EPROM memories 632 and 634 as well as random access memory 636 are controlled from device 628. Memory devices 632 and 634 may be provided, for example, as 4K×8 EPROM components marketed as type M2732AFI by SGS-Thompson, while device 636 may be provided, for example, as a 2K×8 EEPROM memory marketed as type 2816C by Xicor Corporation.

Figure 9B:
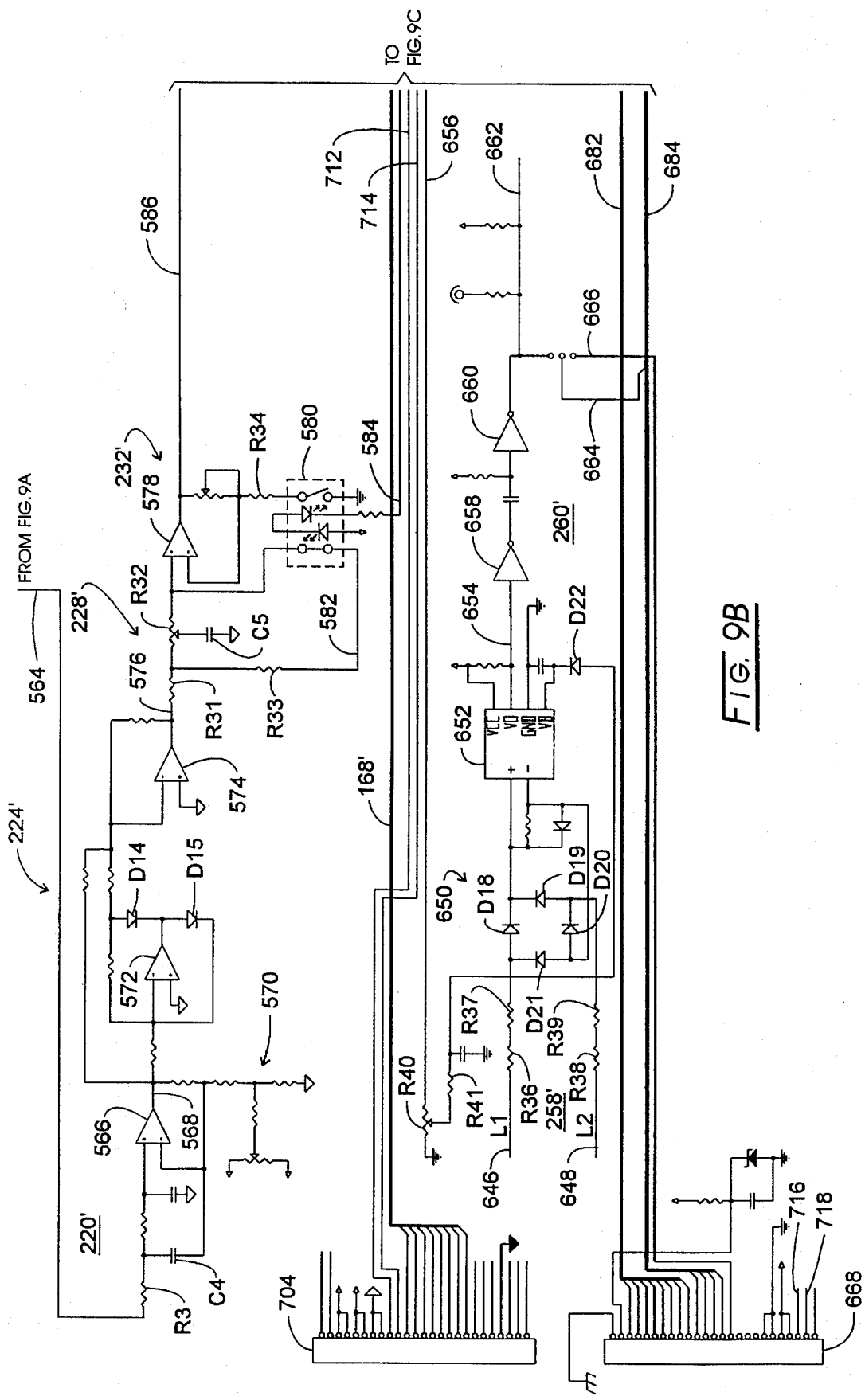
Figure 9C:
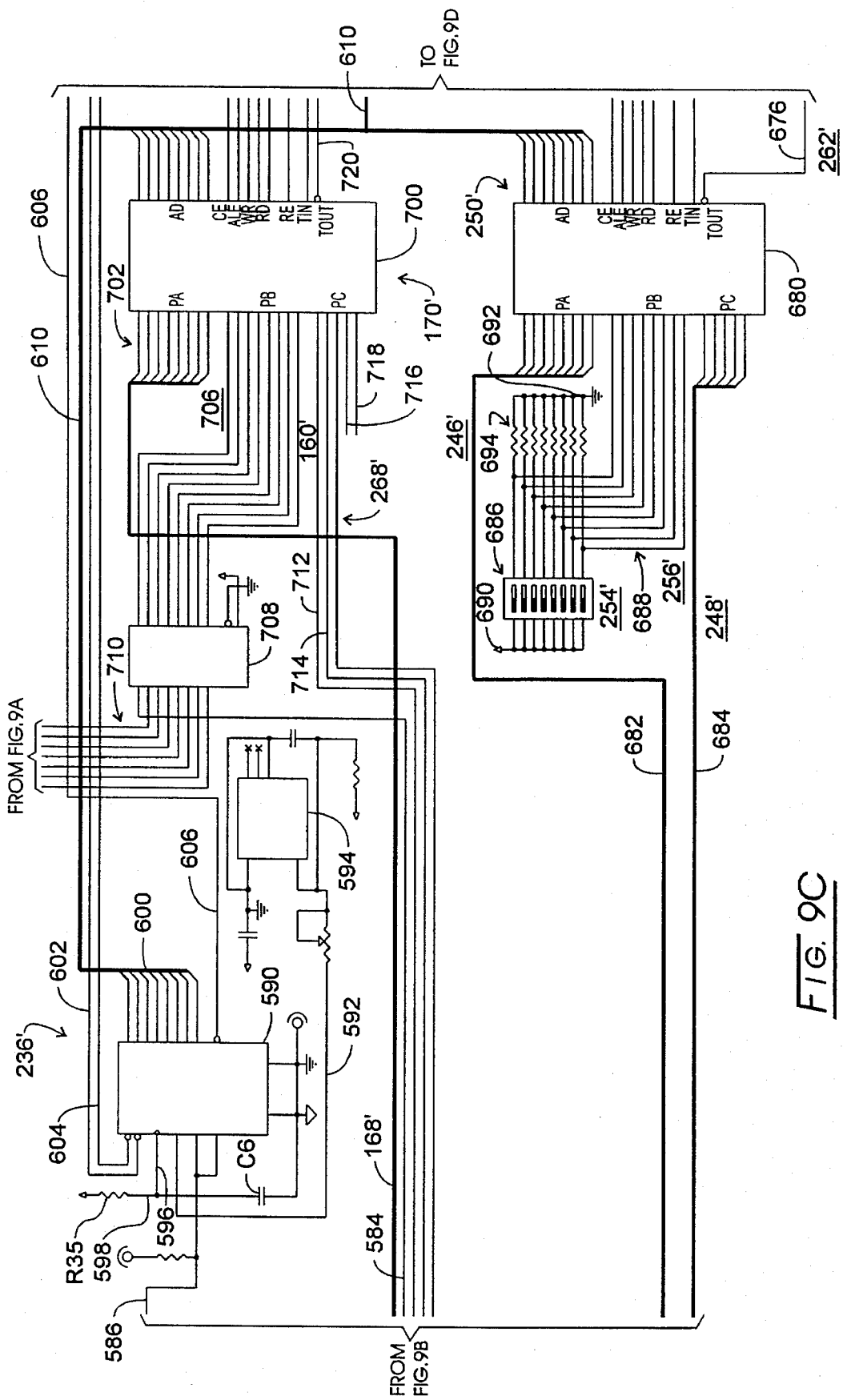
Figure 9D:
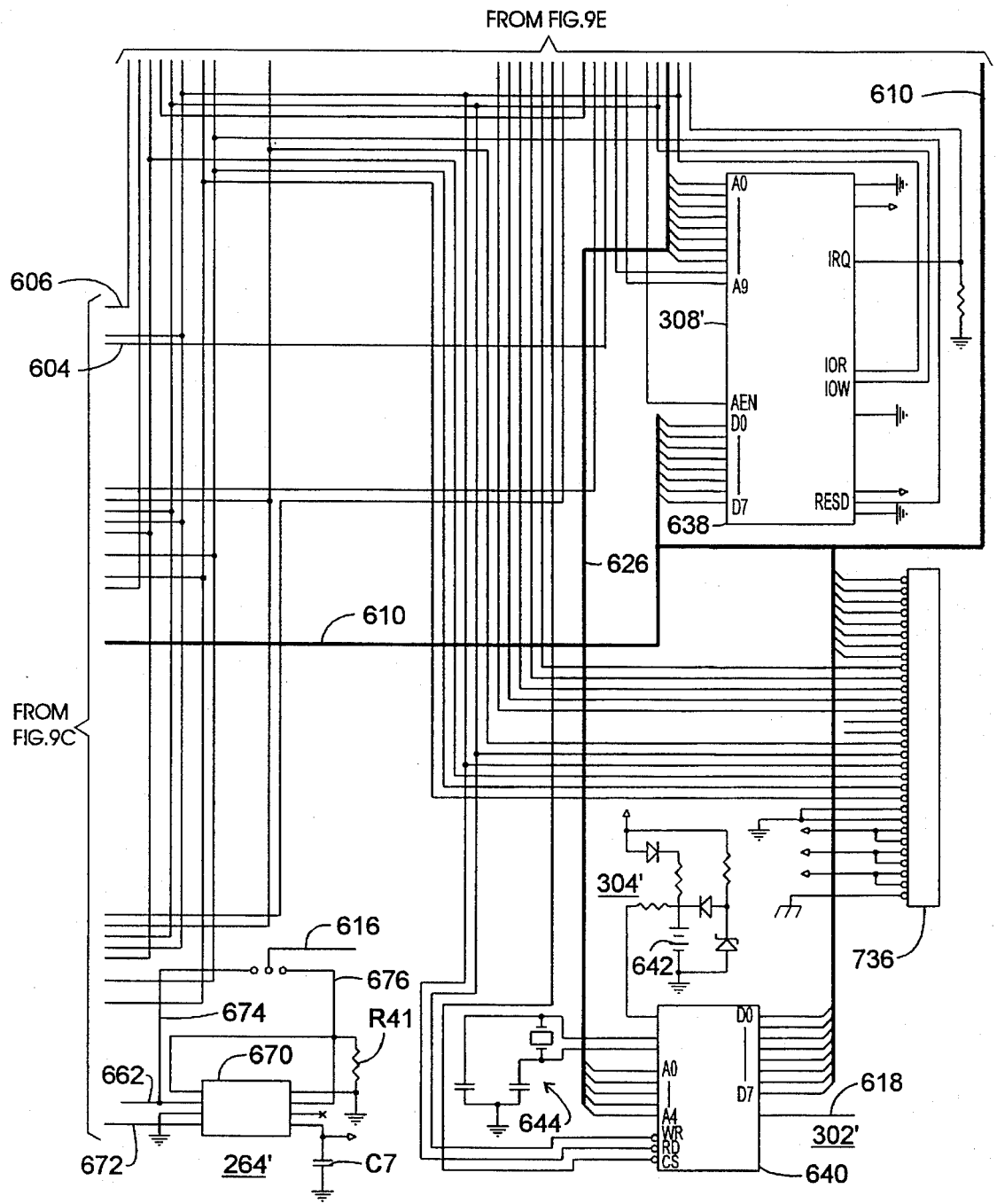
Figure 9E:
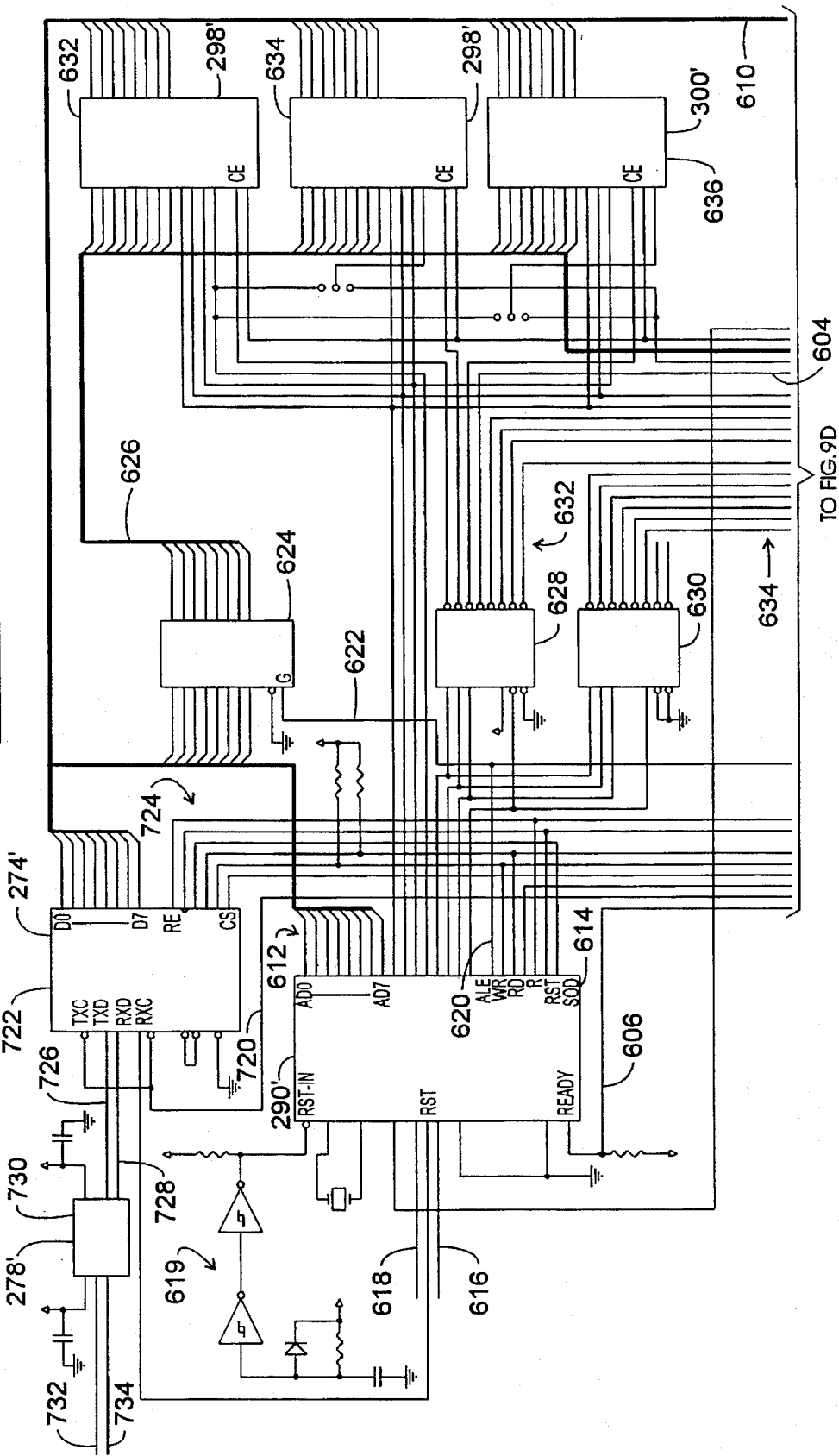

Microprocessor 614 also performs in conjunction with a modem seen in FIG. 9D at 638. Modem 638 has been described in conjunction with FIG. 4A at 308, which numeration reappears in the instant figure in primed fashion. The enable input (AEN) of device 638 is coupled with decoder 628, while the read command terminal thereto (IOR) is coupled to a common command line deriving signals from the read (RD) terminal of device 614. Correspondingly, the write command terminal of device 638 (IOW) is coupled by common command lines to the corresponding write terminal of device 614 (WR). Not seen in FIG. 9D are the phone jacks that are associated with device 638 as described at block 308 in FIG. 4A. Finally, the reset terminal of device 638 (RESDRV) is coupled with the reset output (RST-OT) terminal of microprocessor 614.

Device 614 also performs in conjunction with a timer clock as seen at 640 in FIG. 9D. Device 640 may be provided, for example, as a type LV8571A timer clock marketed by National Semi-Conductor, Inc. Device 640 performs in conjunction with a back-up battery 642 and an oscillator network 644. It has been described along with battery 642, respectively at 302 and 304 in FIG. 4A, those numbers appearing in the instant figure in primed fashion. In addition to providing time of day/date information, device 640 includes general timing functions. In this regard, a timer output is provided at its interrupt port at line 618 which is directed to the RST 5.5 input terminal of microprocessor 614. The chip select terminal (CS) of device 640 is coupled to decoder 630 (FIG. 9E), while the read (RD) and write (WR) terminals of the device are coupled to the common read and write command lines emanating from the corresponding terminals of microprocessor 614.

The strobe input to microprocessor 614 at line 616 provides a command for the collection of data and is derived from the power supply of the safety system being interrogated. Looking to FIG. 9B, lines 646 and 648 carry the typically 60 Hz signal of the safety system as earlier designated L1 and. L2. This 60 Hz signal is directed through limiting resistors R36–R39 and a bridge network 650 comprised of diodes D18–D21 to the + and − inputs of an opto-coupler 652. With the arrangement shown, the negative to positive zero crossing of the inputs are detected and presented as a 60 Hz signal at output line 654. Device 652 may be provided, for example, as an earlier-described type 6N 139 opto-coupler. For applications, for example where a type MID400 opto-coupler as earlier described are employed as device 652, a sensitivity adjustment may be provided by application of a signal along line 656 through a sensitivity adjusting network including variable resistor R40 and resitor R41 to the VB input of device 652 through diode D22. The 60 Hz signal at line 654 is sharpened by application through two Schmitt inverters 658 and 660 to provide a 60 Hz strobe signal at line 662. The 60 Hz input and strobe generation have been described in FIG. 4A in conjunction with arrow 258 and block 260. Those numbers reappear in the instant figure in primed fashion. In general, the circuit 260' is configured to provide either a 60 Hz or 120 Hz strobe signal at line 662. For the instant demonstration, the former frequency is provided. Line 662 reappear in FIG. 9D as an input to a strobe delay control device 670 earlier described in connection with FIG. 4A at 264, which number reappears in primed fashion. Device 670 is a fixed timer/counter which combines a counter with an internal oscillator. The oscillator component of device 670 can be inhibited and an external clock applied to the I/O terminal thereof. This clock is applied via line 672. Device 670 may be provided, for example, as a type ICM7242 marketed by Maxim, Inc. By appropriate jumpering, the strobe signal itself at line 662 can be applied via line 674 as the strobe for the microprocessor or a strobe delayed from that cross-over related signal may be provided from line 676. By utilizing the delayed strobe arrangement, assurance may be had that sampling is occurring during the passage of current through a safety system contact.

Line 672 emanates from the T-out terminal of 680 described earlier in connection with FIG. 4A at 250, which numeration appears in primed fashion in the instant figure. Device 680 may be provided, for example, as a type 8155 programmable interface adapter (PIA) marketed by Intel Corp. PIA device 680 receives the identifier signals corresponding with the unique identifier condition derived at the monitoring interface apparatus via bus components 682 and 684. These components have been described in connection with FIG. 4A, respectively at 246 and 248, which numbers reappear in the instant figure in primed fashion. Bus components 682 and 684 are seen in FIG. 9B to extend to header 668 which, in turn, is coupled with header 508 of FIG. 8B. The B port terminals of device 680 are configured to receive an interrogator assembly unique identification input from dip switch array 686 and line array 688. These latter components have been described in connection with FIG. 4A, respectively, at 254 and 256, which numbers reappear in primed fashion in the instant figure. The discrete switches of device 686 are coupled between Vcc at line 690 and ground at line 692 through an array of resistors shown at 694.

Control association of PIA device 680 with microprocessor 614 is from its CE terminal, which is coupled with decoder 628, its address latch enable (ALE), write (WR) and read (RD) terminals. The reset terminal (RE) is coupled with the corresponding reset out terminal of device 614.

Positioned above PIA 680 is another identical programmable interface adapter (PIA) 700. Device 700 has been described at 170 in connection with FIG. 4A, which number reappears in primed fashion. Provided, as before, as a type 8155, the A port components of device 700 are coupled via line array 702 which becomes earlierdescribed bus 168, which number is herein reproduced in primed fashion. Bus 168' extends across FIG. 9B to a header or connector 704 which, in turn, is electrically connected with connector 484 seen in FIG. 8C. It may be recalled that that connector receives the output signals of the switch fault detectors F1–F8.

Returning to FIG. 9C, the B ports of PIA device 700 are coupled via line array 706 to one side of a latch 708. Device 708 may be provided, for example, as a type 74LS373 and serves to provide an adequately sustaining signal to select leads of the array 710. One line with array 710 is earlierdescribed line 584 which, as described in conjunction with FIG. 9B serves to control opto-switch 580. The remaining leads extend, as seen in FIG. 9A, to control switches via lines 522, 540, 548, 550, 556, 560, and 562.

Returning to FIG. 9C, the port C terminals of device 700 generally are employed for test and sensitivity adjustment purposes. In this regard, lines 712 and 714 extend across FIG. 9B and are connected through header 704 where they are seen to continue electrically via connector 484, in FIG. 8C, to network 464 shown in FIG. 8A. In that figure, a signal applied via line 712 is directed through diode D23 and resistor R24 to line 466 to generate a test fault signal. The control signal provided at line 714 is associated with diode D24 and resistors R45–R48 and diode D25 for the purpose of adjusting the sensitivity of devices F1–F8 so as to accommodate for high noise levels or the like which may be encountered at a factory environment.

Returning to FIG. 9C, lines 716 and 718 within port C of device 700 are directed from header 668 to header 508 shown in FIG. 8B where they extend to jumpered connections 502 and 504 and connector 460 shown in FIG. 8A. At the interface device, as seen in FIG. 5C, the signal at line 712 is asserted as the signal at line 386 to device 444.

Returning to FIG. 9C, control association of device 700 with microprocessor 614 is developed in conjunction with commonly denoted terminals CD, ALE, WR, RD, TN, and RE. The frequency output at the TOUT terminal and at line 720 extends to the TXC and RXC terminals of a universal synchronous/asynchronous receiver transmitter (USART) shown at 722 in FIG. 9E. Finally, the eight address terminals of device 700 are coupled with bus 610.

Returning to FIG. 9E, USART device 722 may be provided as a type 8251A programmable communication interface marketed by Intel, Inc. and is controlled from microprocessor 614 via the lead array 724 which is coupled, reading downwardly in the sense of the figure, with terminals: RESET, CLK, C/D, RD, WR, and CS. The parallel input to it is from bus 610 at its D0–D7 terminals, and its serial outputs and inputs are present at transmit line 726 and receive line 728. Lines 726 and 728 are directed, respectively, to the DA and RY terminals of a line driver and receiver 730 which may be provided as a type SN75155 marketed by Texas Instruments, Inc. Device 730 performs under EIA standard RS-232C and provides transmit and receive functions, respectively at 732 and 734.

Figure 10:
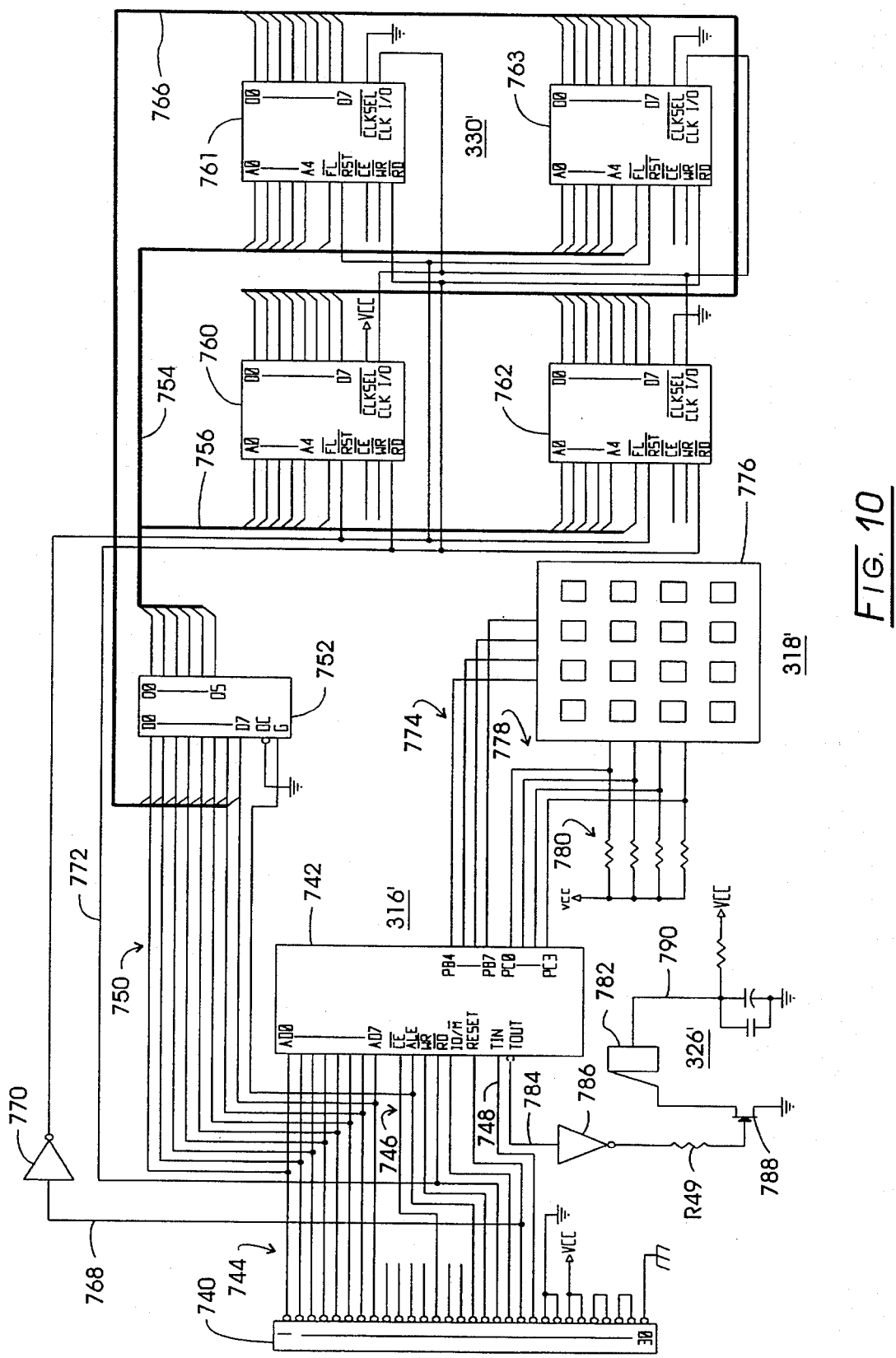
FIG. 10 is an electrical schematic diagram of the manual input and readout features of the interrogator assembly of the system of the invention.

Turning to FIG. 9D, a header 736 is shown. This header is connected with eight leads of bus 610 as well as with seven of the eight outputs of decoder 630 (FIG. 9E), and the ALE, WR, RD, IO/M, reset, and CLK connections from microprocessor 614. Header 736 is connected to a corresponding header 740 seen in FIG. 10. Looking to FIG. 10, another programmable interface adapter (PIA) of the earlier-noted type 8155 is present at 742. Device 742 corresponds with block 316 of FIG. 4C and that number reappears in primed fashion in the instant figure.

Data inputs to PIA 742 are provided from eight lead array 744 which extends to the AD0–AD7 terminals of the device. The noted microprocessor associated controls are present at lead array 746 and are directed to the CD, ALE, WR, RD, IO/M, and RESET terminals of PIA 742. The TIN terminal of device 742 at line 748 receives the clock signal from microprocessor 614. The data lines from array 744 also are coupled via lead array 750 to the D0–D7 inputs of an address latch 752. Device 752 latches the lower eight bits of address and may be provided, for example, as a type 74LS373. The G input to the device is coupled to the ALE terminal of PIA 742. Outputs Q0–Q5 outputs of latch 752 are directed via bus components 754 and 756, inter alia, to the four address inputs A0–A4 of four alpha-numeric programmable displays 760–763. Correspondingly, the eight data inputs are directed to the corresponding data inputs D0–D7 of devices 760–763 via bus component 766 extending from the lead array 750. Reset inputs to devices 760–763 are provided from line 768 which extends through Schmitt inverter 770 to the corresponding reset (RST) terminals of the devices. Device 770 may be provided, for example, as a type 74LS14. Correspondingly, the clock inputs to devices 760–763 are derived from clock I/O terminal of device 760. Devices 760–763 also are under control of microprocessor 614 with respect to the CD, WR, RD, and IO/M terminals. Devices 760–763 may be provided as 0.200 inch eight-character 5×7 dot matrix displays marketed by Siemens, Inc. as Model HDST2114S. They are represented in FIG. 4C at 330, which number reappears in the instant figure in primed fashion. The PB4–PB7 terminals of PIA 742 are coupled via line array 774 to the column inputs of a keypad 776, while the PC0–PC3 terminals thereof at line array 778 are coupled to the horizontal couplings of device 776 as well as through pull-up resistors represented generally at 780 to the Vcc source. Keypad 776 appears in FIG. 4C at 318, which number appears in the instant figure in primed fashion.

Finally, an annunciator or buzzer 782 is seen to be driven from the T OUT terminal of PIA 742 via line 784, Schmitt inverter 786, resistor R49, and transistor 788. Vcc power is supplied to device 782 via line 790. Device 782 additionally is described in FIG. 4C at 326, which number appears in the instant figure in primed fashion.

Figure 11B:
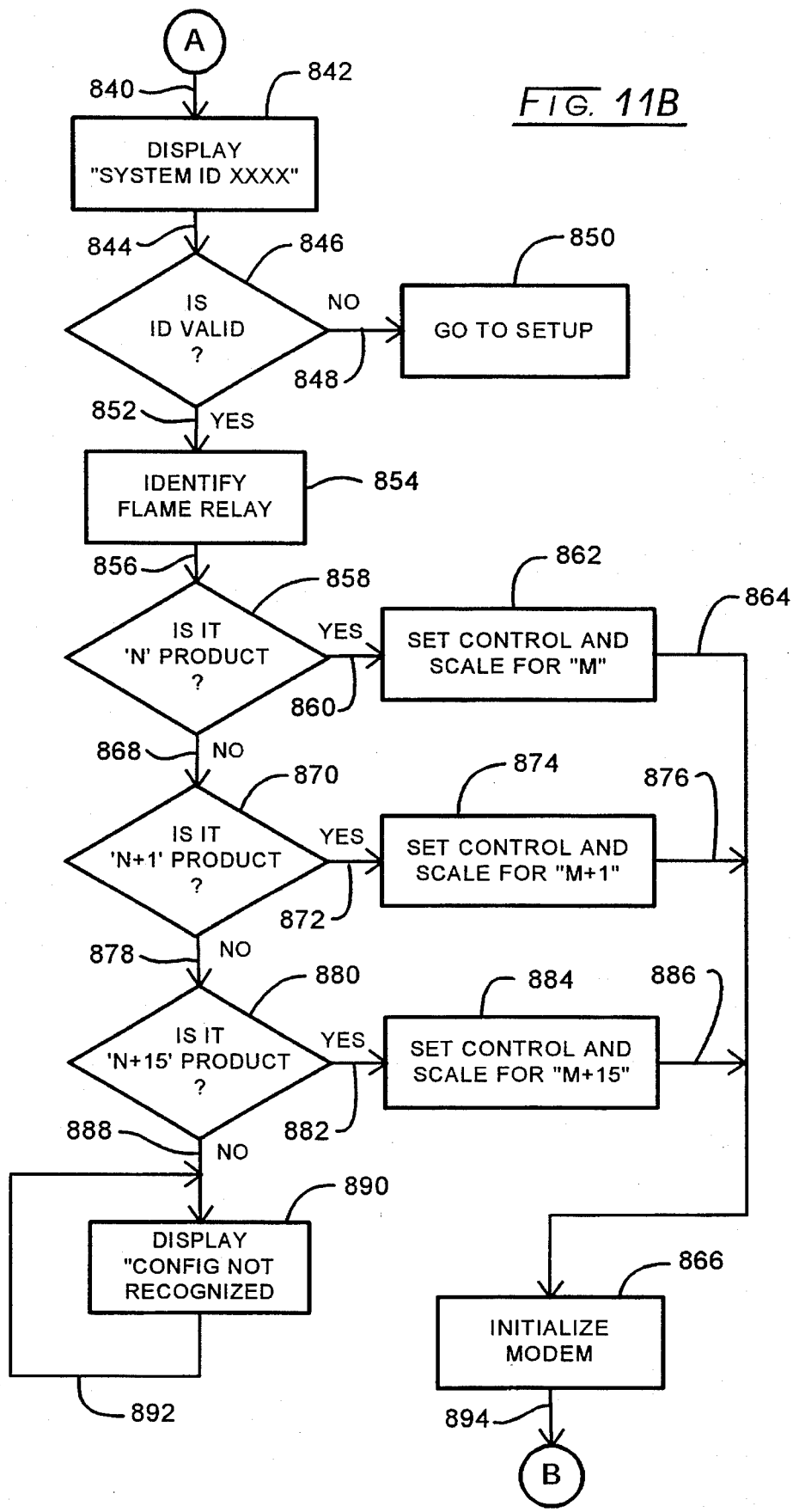
Figure 11C:
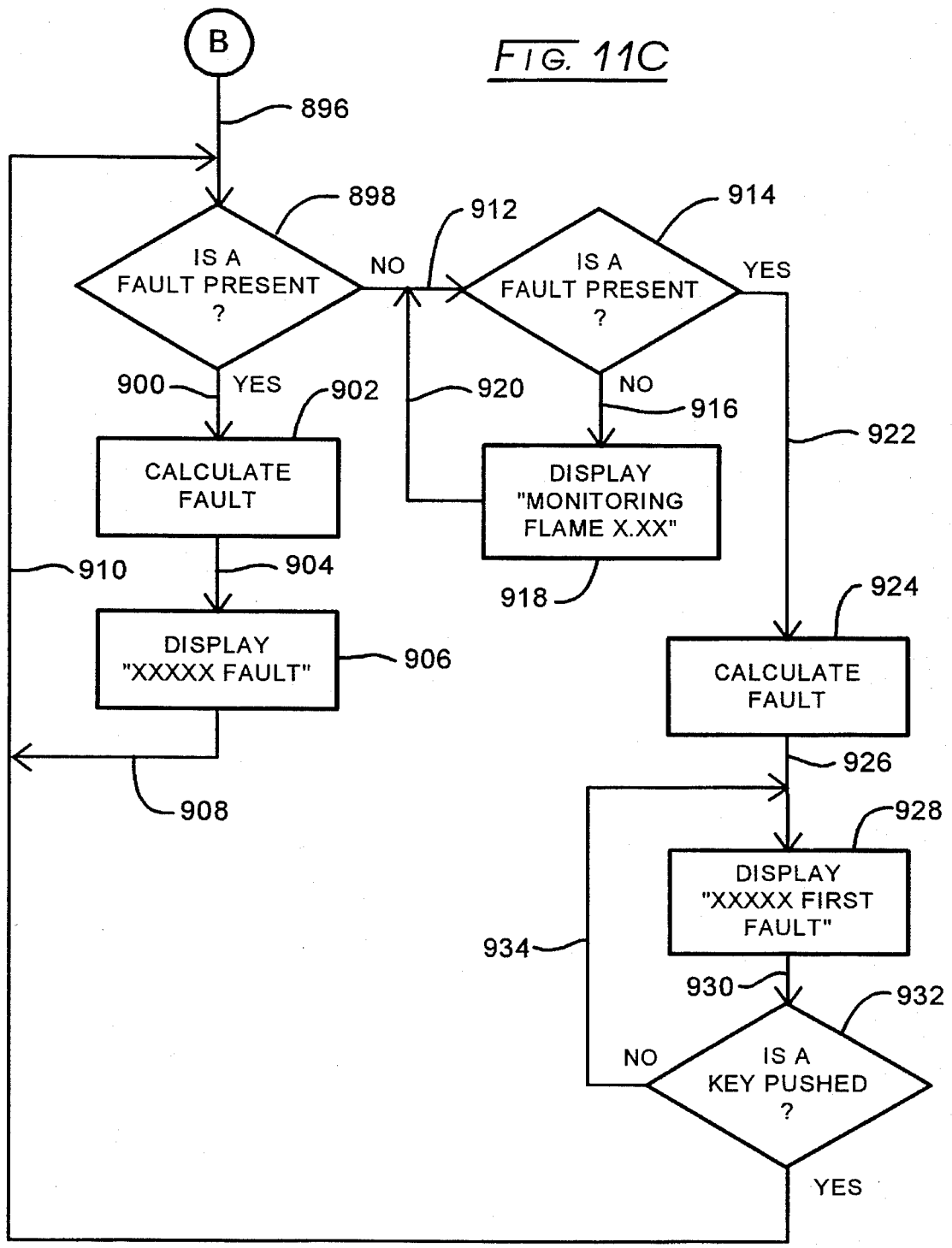

Referring to FIGS. 11A–11C, a main loop form of flow chart is presented looking to the software aspects associated with microprocessor 614. Referring to FIG. 11A, the program commences as represented at start node 800, whereupon, as represented at line 802 and block 804, system initialization is carried out. Following this conventional procedure, as represented at line 806 and block 808, the product trademark is displayed at display 76. Then, as represented at line 810 and block 812, the display reads out "SELF TEST" as self testing is underway as described in conjunction with port C of PIA 700 and FIG. 9C. At the conclusion of this test, as represented at line 814 and block 816, the query is posed as to whether the system has passed the test. In the event that it has, then as represented at line 818 and block 820, the display 72 reads out that the self test has passed The program then continues as represented at line 822.

Where the query posed at block 816 results in a negative determination, then as represented at line 824 and block 826, the display reads out that the self test has failed and the program continues as represented at lines 828 and 822. Next, as represented at block 830, a query is made as to whether the ID cable is connected. This refers to cable 82 described in FIG. 2. In the event of a negative determination, then as represented at line 832 and block 834, the display presents a message that the cable is not connected and the system loops as represented at line 836 until such time as a cable connection is made. With an affirmative determination with respect to the query posed at block 830, then the program proceeds as represented at line 838 and node A.

Referring to FIG. 11B, node A reappears in conjunction with line 840 leading to the instructions at block 842 wherein the system identification as programmed at switch arrays 370 described in conjunction with FIG. 5A are displayed. Then, as represented at line 844 and block 846 the software determines whether the identification so displayed is a valid one, i.e. a determination is made as to whether a set-up has been made for that particular monitoring interface apparatus and associated safety system. In the event that it is not a valid identification, then as represented at line 848 and block 850, the program reverts to a set-up procedure wherein the variables associated with the control system are entered by the line technician.

Where the identification is valid, then as represented at line 852 and block 854, the program commences to identify the type of flame monitor which is present such that automatic programming may take place specific to the type of relay at hand. This will result in a configuration of switches in the analog input channels as described in conjunction with FIG. 4B. For example, line 856 is directed to the query posed at block 858 determining whether the flame monitor is an "N" product. If the determination is that it is indeed such product, then as represented at line 860 and block 862, the system automatically switches to a current channel at a scale appropriate for N product. Such a device, for example, is marketed by Honeywell Corp. as a series R890F. The program then continues as represented at line 864 to the instructions at block 866 providing for the initialization of modem 308 (FIG. 4A). In the event of a negative determination with respect to the query posed at block 858, then as represented at line 868 and block 870, where the query is made as to whether another, herein designated "N+1" product is represented by the flame monitor. In the event that it is, then as represented at line 872 and block 874, the control is automatically configured and scaled for an N+1 device. The program then continues as represented at line 876 and line 864. In the event of a negative determination at block 870, then as represented at line 878 and block 880, a determination is made as to whether the flame monitor is of still another product herein designated "N+15". If it is, then as represented at line 882 and block 884, the control system is configured with appropriate scaling for N+15 device and it then continues to line 864 as represented at line 886. Where the determination at block 880 is in the negative, then as represented at line 888 and block 890, the display reads out that the configuration of the flame monitor is not recognized by the system and the program loops as represented at line 892 until proper configuration information is obtained. The program then continues as represented at line 894 and node B following the initialization of the modem. It may be recalled that the present system is employed in two operational modes at a combustion system. The first is during a start-up during which the system will not start or will start. The second mode of surveillance is one during the operation of the combustion system but under conditions where a shut-down might be expected and information as to that shut-down is desired. Thus, the software determines the presence of a fault initially in a start-up form of operation.

Referring to FIG. 11C, node B reappears in conjunction with line 896 leading to the query at block 898. That query determines whether a fault is present, i.e. an open circuit condition at a safety system contact. If a start-up condition is at hand, then as represented at line 900 and block 902, the particular fault is determined or calculated and as represented at line 904 and block 906, the identification of the fault is read out at the display of the interrogator apparatus. The program then loops as represented by lines 908 and 910.

If following start-up a fault is not present, then the query posed at block 898 will result in a negative determination and as represented at line 912 and block 914 a determination is again made as to whether a fault is present. If no fault is present, then as represented at line 916 and block 918, the value of the monitor output for the flame is displayed as useful information to the line technician or consulting expert. This condition remains until such time as a fault occurs as exemplified by the loop line 920 extending to line 912.

Where the determination to the query posed at block 914 is in the affirmative, then as represented at line 922 and block 924, the fault location is determined or calculated and, as represented at line 926 and block 928, the display indicates the component and first fault status thereof, information quite useful in diagnosing a problem. It may be recalled that ten such first faults are retained in memory. The program then continues as represented at line 930 and block 932, the noted first fault display being retained until such time as a key at the keypad 78 is pushed. This continuing display is represented by loop line 934 extending to line 926. Where a key will have been pushed, then as represented at line 910, extending to line 896, the program awaits another fault occurrence.

Referring to FIG. 12, a routine carried out upon the occurrence of each strobe is illustrated. This routine commences with a start node 940 whereupon, as represented at line 942 and block 944, a determination is made as to whether it is time for an update of the flame monitor value. To avoid excessive alterations of the flame value due to excessively rapid updates, the calculation of the flame monitoring value is carded out, for example, every 20th strobe. Thus, at such time as an update is to be carded out, an affirmative determination is made with respect to the query at block 944 and, as represented at line 946 and block 948, a scale value based upon the type of flame monitor utilized is applied in conjunction with the analog-to-digital value for the flame monitoring signal. This scale value is selected in accordance with the type of flame monitor at hand. The program then continues as represented at line 950.

Where the query posed at block 944 results in a negative determination, then, as represented at line 952, the program diverts to line 950 and block 954. Block 954 provides for obtaining the status of the input switches of the safety system at hand. Then, as represented at line 956 and node 958, the program returns from the interrupt.

FIGS. 13A–13I combine to illustrate the interactive performance of the system at hand and, in particular, looking to the modem 308 interrupt program. Looking to FIG. 13A, the program commences with node 960, line 962 and block 964 wherein the interrupt at hand is acquired. Then, as represented at line 966 and block 968, a determination is made as to whether interrupt at hand is a modem interrupt. If it is not, then as represented at lines 970, 972, and node 974, the program returns from the interrupt. Where the determination is made as to the query posed at block 968 is in the affirmative, then as represented at line 976 and block 978, a query is made as to whether the interrupt at hand is a receive interrupt. In the event that it is not, then the program returns as represented by lines 980, 972, and node 974. In the event of an affirmative determination with respect to the query posed at block 978, then the program diverts as represented at line 982 and node A.

Figure 13A:
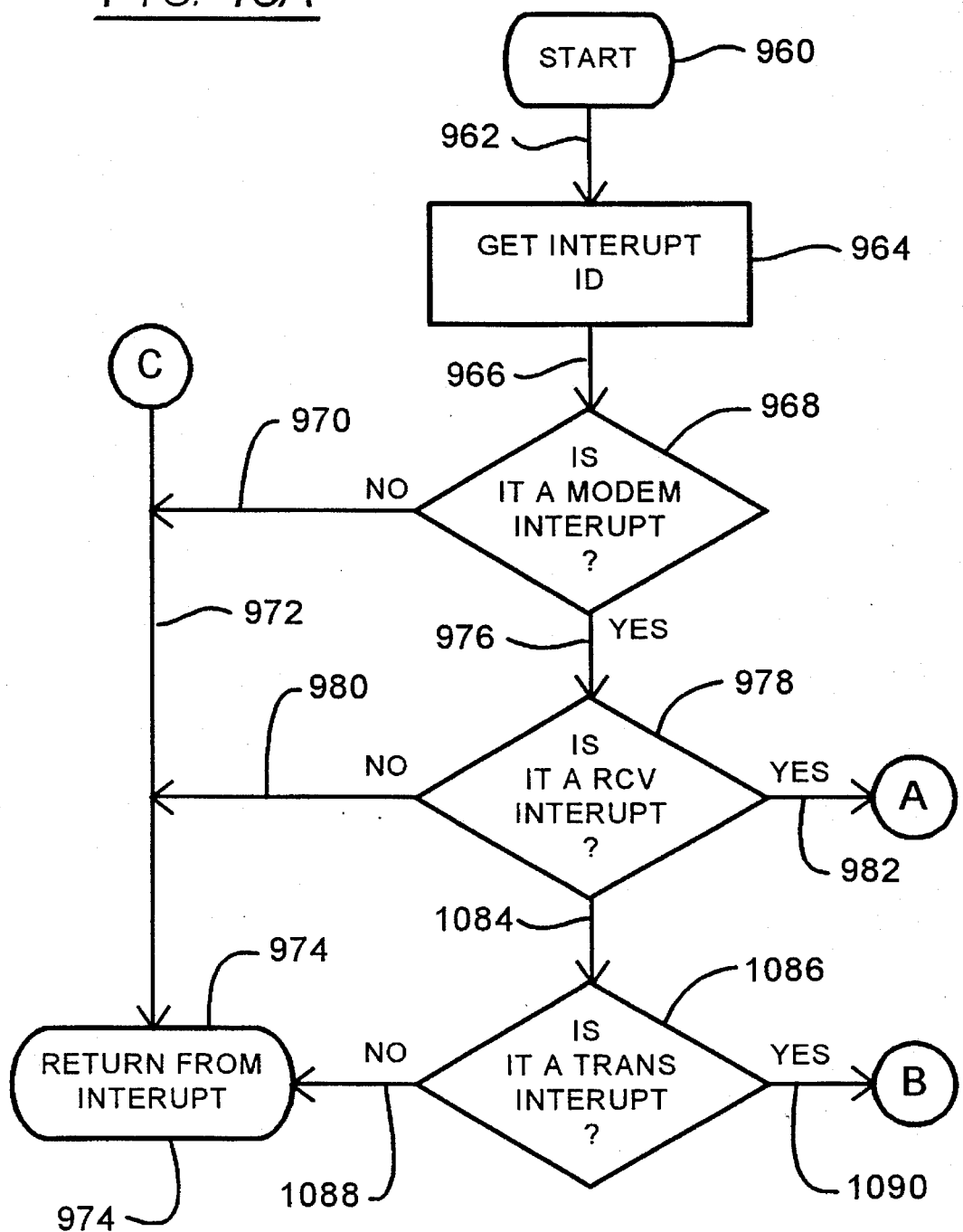
FIGS. 13A–13I are a flow chart describing the modem interrupt components of the software employed with the processor of the interrogator assembly of the invention.
Figure 13B:
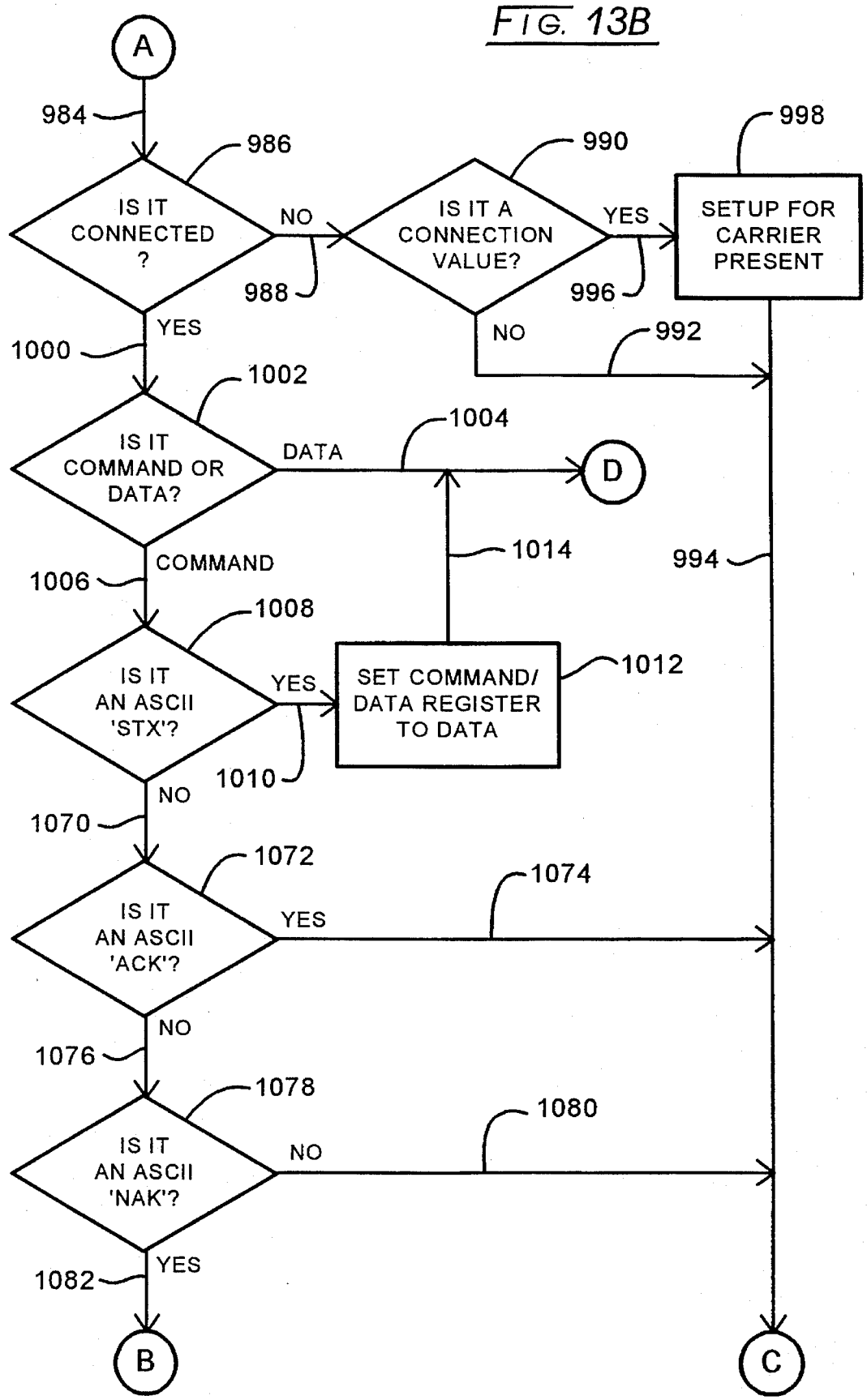

Turning to FIG. 13B, node A reappears in conjunction with line 984 and block 986, wherein a determination is made as to whether a line connection is at hand. If it is not, then as represented at line 988 and block 990, a query is posed as to whether a connection value is present. If it is not, then as represented at lines 992 and 994, the program returns as represented at node C and line 972 in FIG. 13A. Where a determination is made that a connection value is present, then as represented at line 996 and block 998, the program sets-up for a carrier and returns as represented at node C.

Where the determination at block 986 is that connection is present, then as represented at line 1000 and block 1002, a determination is made as to whether the interrupt represents a command or data. Where it represents data, then as represented at line 1004, the program diverts as represented at node D. Where a command is determined to be present, then as represented at line 1006 and block 1008, a determination is made as to whether the interrupt is an ASCII start command (STX). Where an STX command. is at hand, then as represented a line 1010, block 1012, and line 1014, the command/data register is set to data and the program diverts to line 1004 and node D.

Figure 13C:
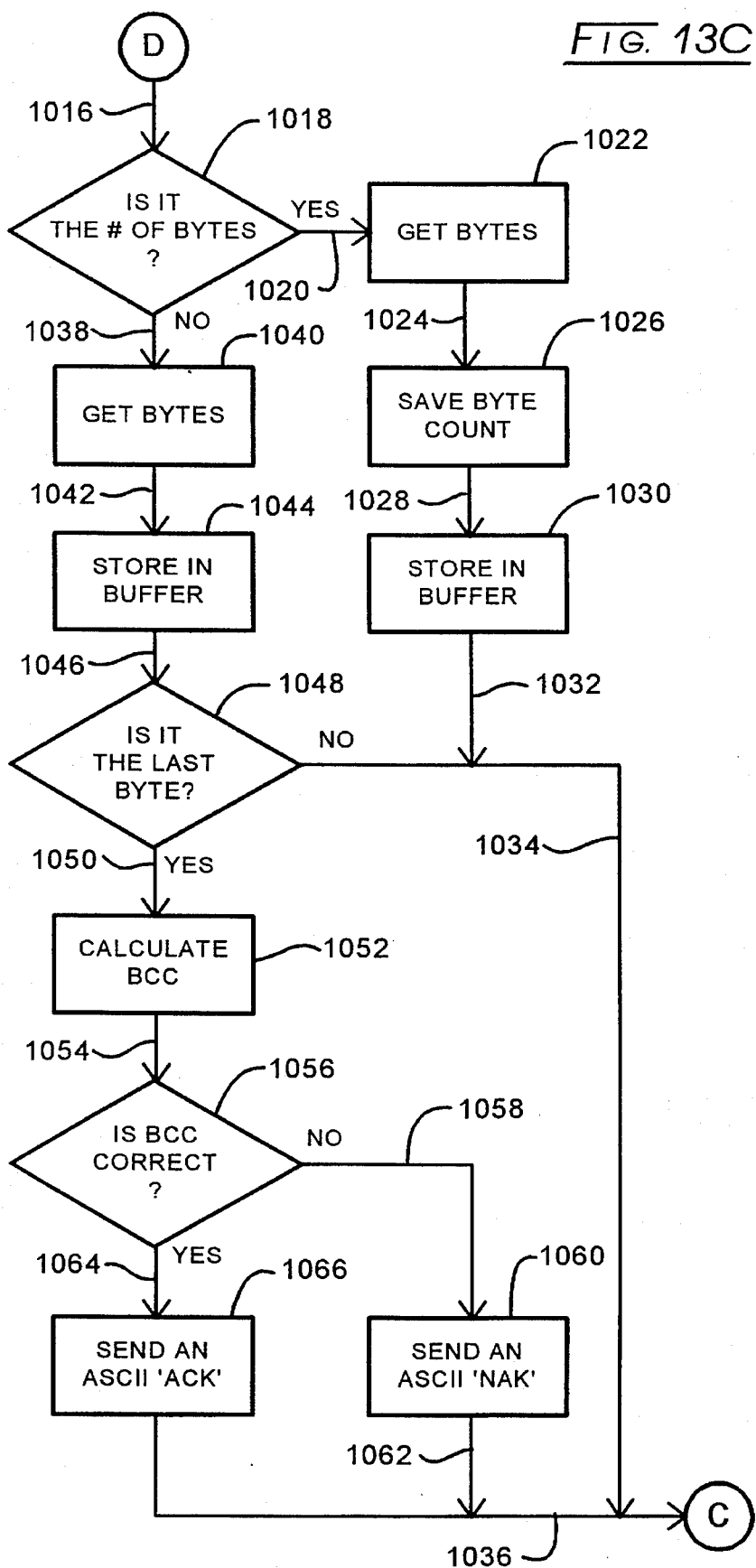

Referring to FIG. 13C, node D reappears in connection with line 1016 and block 1018. At block 1018, the query is made as to whether the command represents the number of bytes of the message. In the event of an affirmative determination, then as represented at line 1020 and block 1022, the byte is acquired and, as represented at line 1024 and block 1026, the byte count is saved. Then, as represented at line 1028 and block 1030, the byte count is stored in a buffer and the program returns as represented at lines 1032, 1034, 1036, and node C (FIG. 13A).

Where the query posed at block 1018 results in a negative determination, then as represented at line 1038 and block 1040, the byte is acquired and, as represented at line 1042 and block 1044, they are stored in buffer. Next, as represented at line 1046 and block 1048, a query is made as to whether the last byte has arrived. In the event that it has not, then the program returns as represented at lines 1034, 1036, and node C. Where the last byte is determined to be present, then as represented at line 1050 and block 1052, the program calculates a binary code check (BCC). Then, as represented at line 1054 and block 1056, query is made as to whether the BCC is correct. If it is incorrect, then as represented at line 1058 and block 1060, an ASCII negative acknowledge (NAK) is sent and the program returns as represented at lines 1062, 1036, and node C.

Where the query posed at block 1056 shows that the BCC calculated is correct, then as represented at line 1064 and block 1066, an ASCII acknowledge (ACK) command is sent and the program returns as represented at line 1036 and node C.

Returning to FIG. 13B, where the query posed at block 1008 indicates that an ASCII start command (STX) is not present, then as represented at line 1070 and block 1072, query is made as to whether the command is an ASCII acknowledge (ACK). If it is an ACK command, then as represented at lines 1074, 994, and node C, the program returns. Where an ACK command is not present, then as represented at line 1076 and block 1078, a query is made as to whether the command is a negative ackowledge (NAK) command. If the command is not an NAK command, then, as represented at lines 1080, 994, and node C, the program returns. Where a negative acknowledge command has been received, then the prrogram continues as represented at line 1082 and node B.

Returning to FIG. 13A, where the determination at block 978 is that an RCV interrupt is not present, then as represented at line 1084 and block 1086, a query is made as to whether a transmission interrupt is present. If such a transmission interrupt is not present, then the program returns as represented at line 1088 and node 974. Where a transmission interrupt is determined to be present, then as represented at line 1090, the program continues as represented at node B.

Figure 13D:
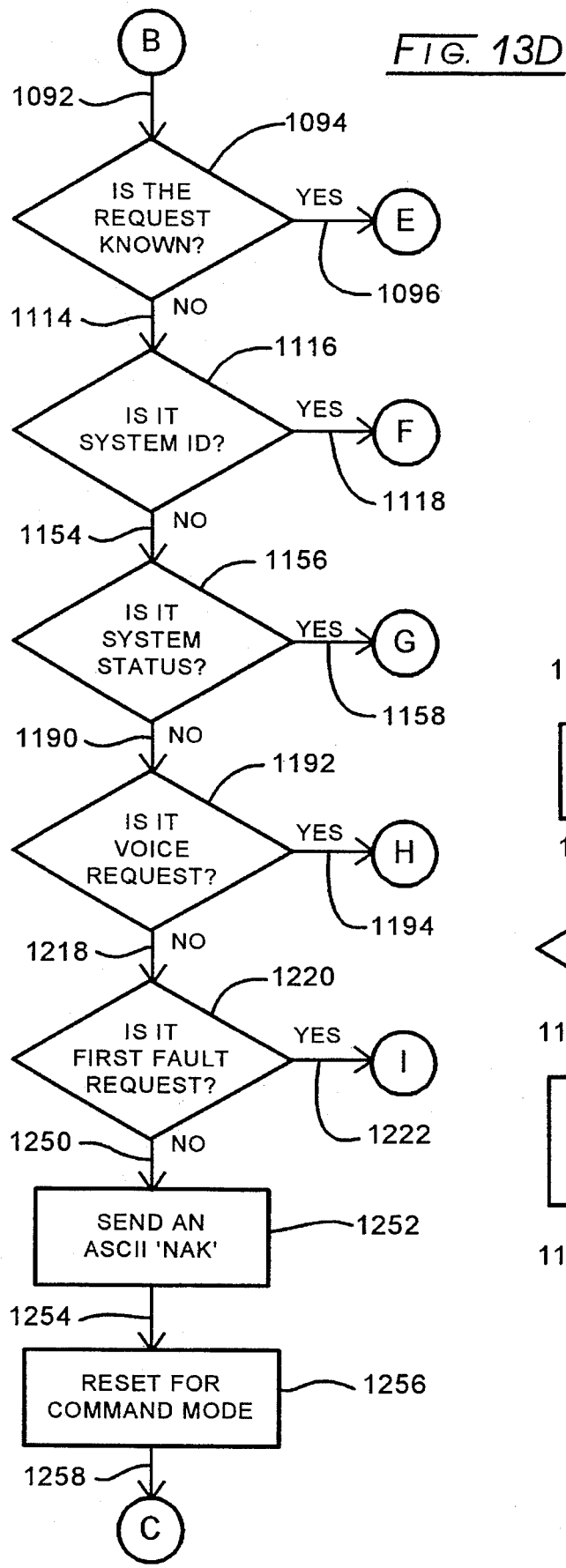
Figure 13E:
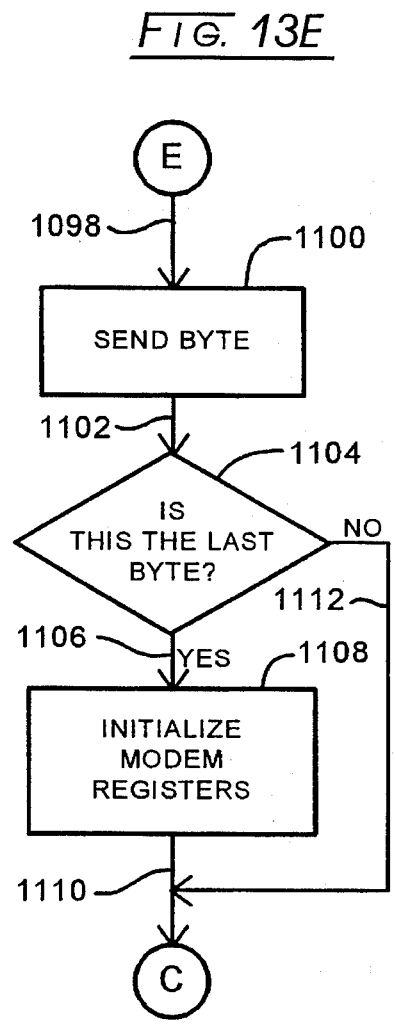

Referring to FIG. 13D, node B reappears in conjunction with line 1092 and block 1094. At the latter block, the query is made as to whether the request is known. In the event that it is, then as represented at line 1096, the program continues as represented at node E. Looking additionally to FIG. 13E, node E reappears in conjunction with line 1098 and block 1 100. The latter block provides for the transmission of the byte and, as represented at line 1102 and block 1104, a query is made as to whether this is the last byte. If it is the last byte, then as represented at line 1106 and block 1108, the modem registers are initialized and the program returns as represented at line 1110 and node C. Where the query posed at block 1104 results in a determination that the last byte is not present, then as represented at line 1112 and line 1110, the program returns as repsented at node C.

Returning to FIG. 13D, the program continues to interrogate the type of command. In this regard, where the query posed at block 1094 results in a negative determination, then as represented at line 1114 and block 1116, a query is posed as to whether the command is for a system identification. In the event of an affirmative determination, then as represented at line 1118, the program reverts as represented at node F.

Figure 13F:
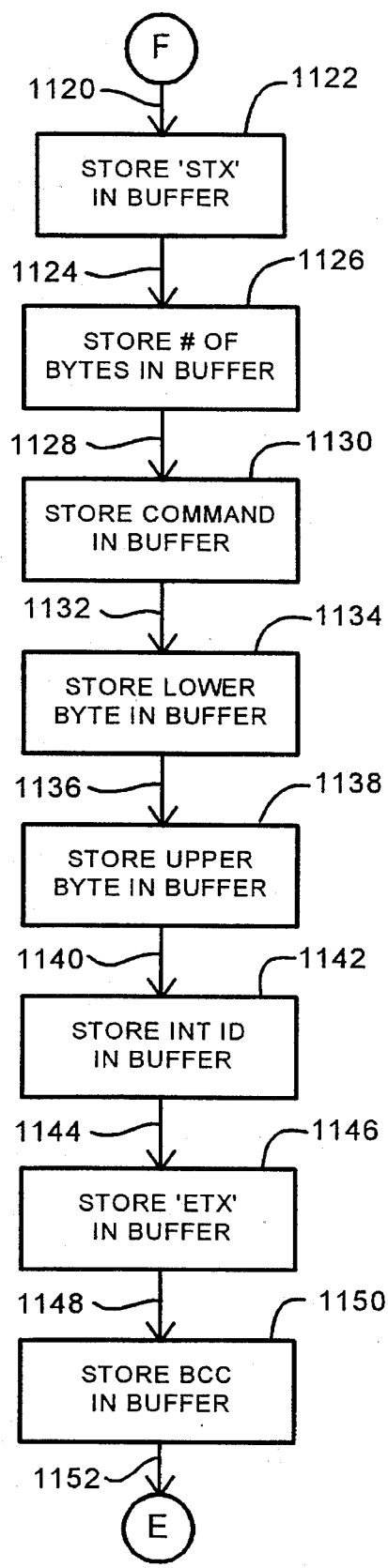

Referring to FIG. 13F, node F reappears in conjunction with line 1120 and block 1122 providing for the storing of a start command (STX) in buffer. Then, as represented at line 1124 and block 1126, the number of bytes of the message are stored in buffer and, as represented at line 1128 and block 1130, the command is stored in buffer. The program then continues as represented at line 1132 and block 1134 wherein the lower byte is stored in buffer. Next, as represented at line 1136 and block 1138, the upper byte is stored in buffer. Then, as represented at line 1140 and block 1142, the system identification is stored in buffer. This is the identification described in conjunction with block 254 in FIG. 4A.

Next, as represented at line 1144 and block 1146, the end transmission (ETX) command is stored in buffer. Then, as represented at line 1148 and block 1150, the binary code check (BCC) is stored in buffer and the program continues as represented at line 1152 and node E. Node E reappears in FIG. 13E as discussed above.

Returning to FIG. 13D, where the query posed at block 1116 results in a negative determination, then as represented at line 1154 and block 1156, a determination is made as to whether the request command is for system status. In the event of an affirmative determination with respect to that query, then as represented at line 1158, the program diverts as node G.

Figure 13G:
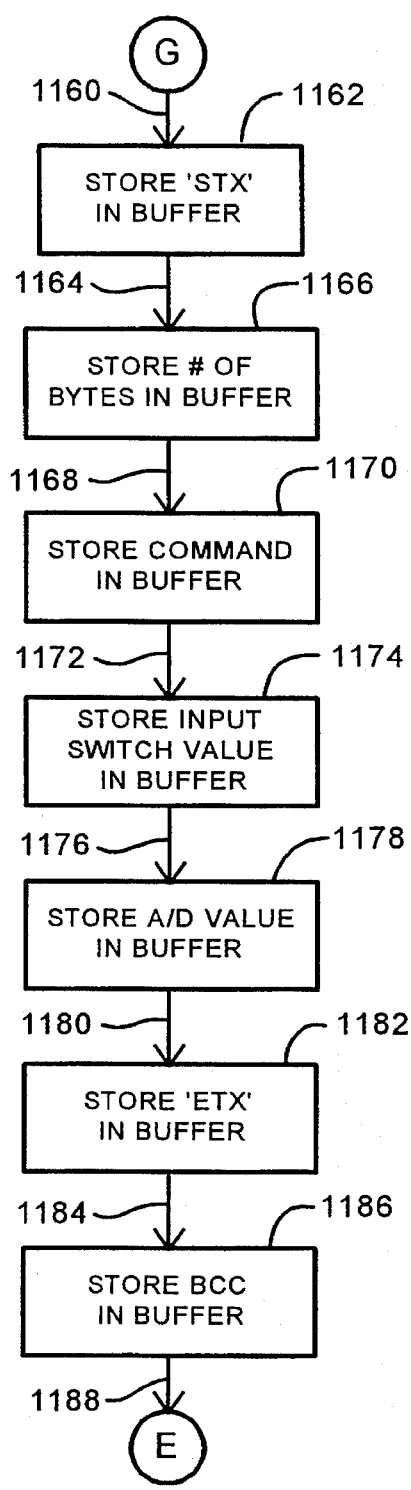

Referring additionally to FIG. 13G, node G reappears in conjunction with line 1160 and block 1162. The start command (STX) is stored in buffer, whereupon as represented at line 1164 and block 1166, the number of bytes of the message are stored in buffer. Then, as represented at line 1168 and block 1170, the command at hand is stored in buffer and, as represented at line 1172 and block 1174, the input switch values are stored in buffer. These are the 115 v AC switch input values. Next, as represented at line 1176 and block 1178, the analog-to-digital converter value is stored in buffer, whereupon, as represented at line 1180 and block 1182, an end of transmission (ETX) command is stored in buffer and, as represented at line 1184 and block 1186, the binary code check (BCC) is stored in buffer. Following that storage, as represented at line 1188, the program reverts as represented at node E as described in conjunction with FIG. 13E.

Returning to FIG. 13D, where a negative determination is made with respect to the query posed at block 1156, then as represented at line 1190 and block 1192, a query is made as to whether a voice request is at hand. This alters the modem from a data transmitting component to a telephone. In the event of an affirmative response to the query posed at block 1192, then the prgram reverts as represented at line 1194 and node H.

Figure 13H:
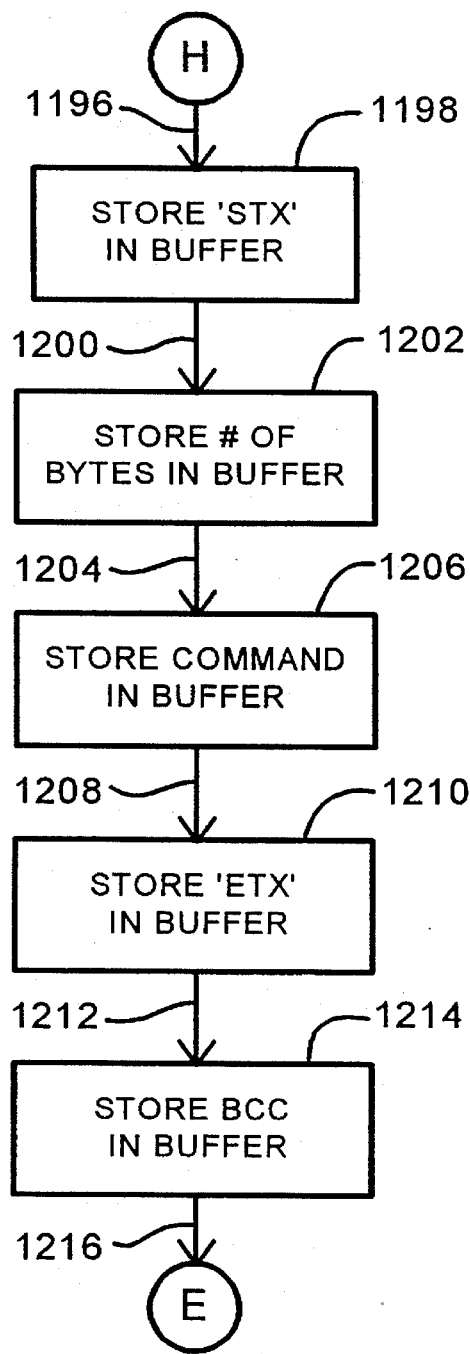

Looking additionally to FIG. 13H, node H reappears in conjunction with line 1196 and block 1198. At the latter block, the start command (STX) is stored in buffer, whereupon, as represented at line 1200 and block 1202, the number of bytes of the message are stored in buffer. Then, as represented at line 1204 and block 1206, the command at hand is stored in buffer and as represented at line 1208 and block 1210, an end transmission command (ETX) is stored in buffer, whereupon, as represented at line 1212 and block 1214, the binary code check (BCC) is stored in buffer. The program then continues with transmission as represented at line 1216 and node E. Node E reappears in FIG. 13E as discussed above.

Returning to FIG. 13D, where the query posed at block 1192 results in a negative determination, then as represented at line 1218 and block 1220, a query is made as to whether the demand is a first fault request. In the event of an affirmative determination, then as represented at line 1222, the program reverts as represented at node I.

Figure 13I:
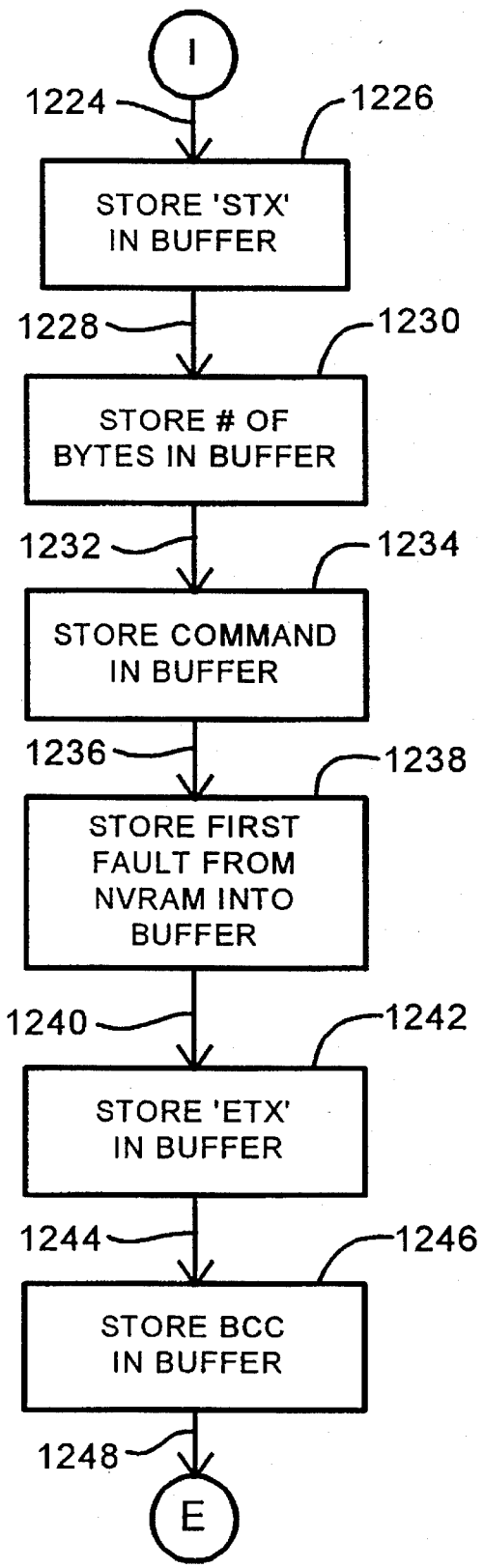

Looking additionally to FIG. 13I, node I reappears in conjunction with line 1224 and block 1226. The latter block provides for storing the start command (STX) in buffer, whereupon as represented at line 1228 and block 1230, the number of bytes of the message are stored in buffer. Then, as represented at line 1232 and block 1234, the command at hand is stored in buffer and, as represented at line 1236 and block 1238, the first faults as stored in non-volatile random access memory as described at block 300 in connection with FIG. 4A are stored in buffer. Next, as represented at line 1240 and block 1242, the end transmission (ETX) command is stored in buffer and, as represented at line 1244 and block 1246, the binary code (BCC) is stored in buffer. Next, as represented at line 1248, the program reverts to node E which reappears, as described above, in connection with FIG. 13E.

Returning to FIG. 13D, where the query posed at block 1220 results in a negative determination, then as represented at line 1250 and block 1252, the program sends an ASCII negative acknowledge (NAK) command and, as represented at line 1254 and block 1256, the program is reset for a command mode. The program then reverts to node C as represented at line 1258. Node C reappears in conjunction with FIG. 13A providing for the return from the interrupt.

Figure 14A:
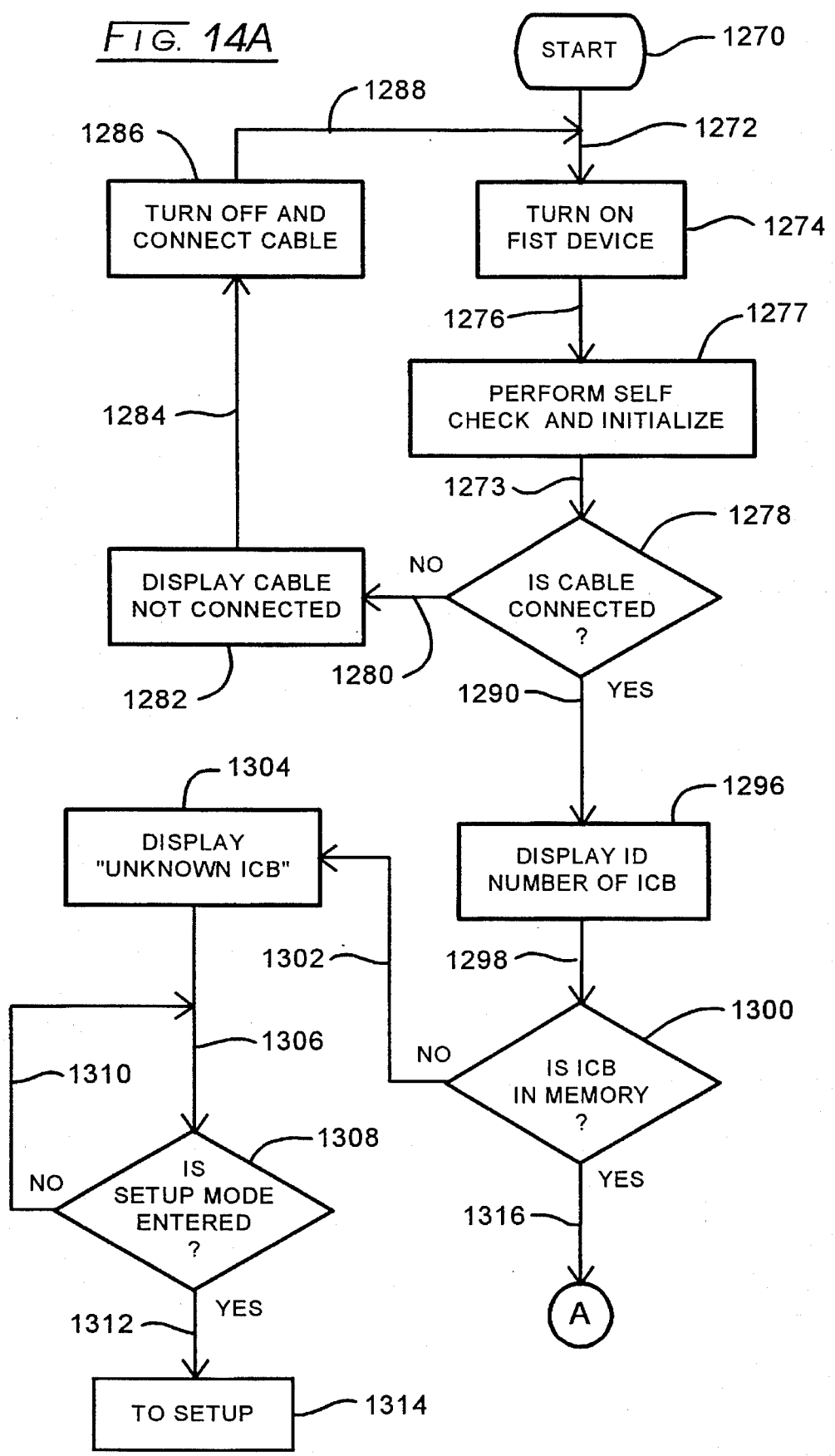
FIGS. 14A–14B are a flow chart showing the operation of the system of the invention.

Referring to FIGS. 14A and 14D, a flow chart is presented providing an operational review of the system of the invention. Looking to FIG. 14A, the chart commences as represented at node 1270, line 1272, and block 1274 with a turning on of the interrogating device 74. This generally is carded out by throwing a switch at the rear of its housing. Then, as represented at line 1276 and block 1277, the system performs a self-check and initialization, for example as described in connection with PIA 170 and test control 270 (FIG. 4A). Next, as represented at line 1273 and block 1278, a determination is made as to whether the cables are connected. If they are not so connected, then as represented at line 1280 and block 1282, the display 76 indicates that a cable is not connected and, as represented at line 1284 and block 1286, the line technician turns off the device 74 and connects cables 82 and 84. The procedure now is seen to return to line 1272 as represented at line 1288. Where the cable is appropriately connected, then the procedure continues as represented at line 1290 and block 1296, where the unique identification number as described in connection with block 146 of FIG. 4A is displayed. Next, as represented at line 1298 and block 1300, a query is made as to whether the displayed identification number is in memory. If it is not, then as represented at line 1302, the display 76 reads out the presence of an unknown ICB as represented at block 1304. Then, as represented at line 1306 and block 1308, a query is made as to whether a set-up mode has been entered. This is a mode wherein the parameters associated with a given safety system are entered in non-volatile memory by the operator either through a portable general purpose computer 286 or the keypad 78. The procedure loops in the event that the mode has not been entered as represented at line 1310. Where the set-up mode has been entered, then as represented at line 1312 and block 1314, the set-up procedure is carried out.

Where the query posed at block 1300 results in an affirmative determination, then the program continues as represented at line 1316 and node A.

Figure 14B:
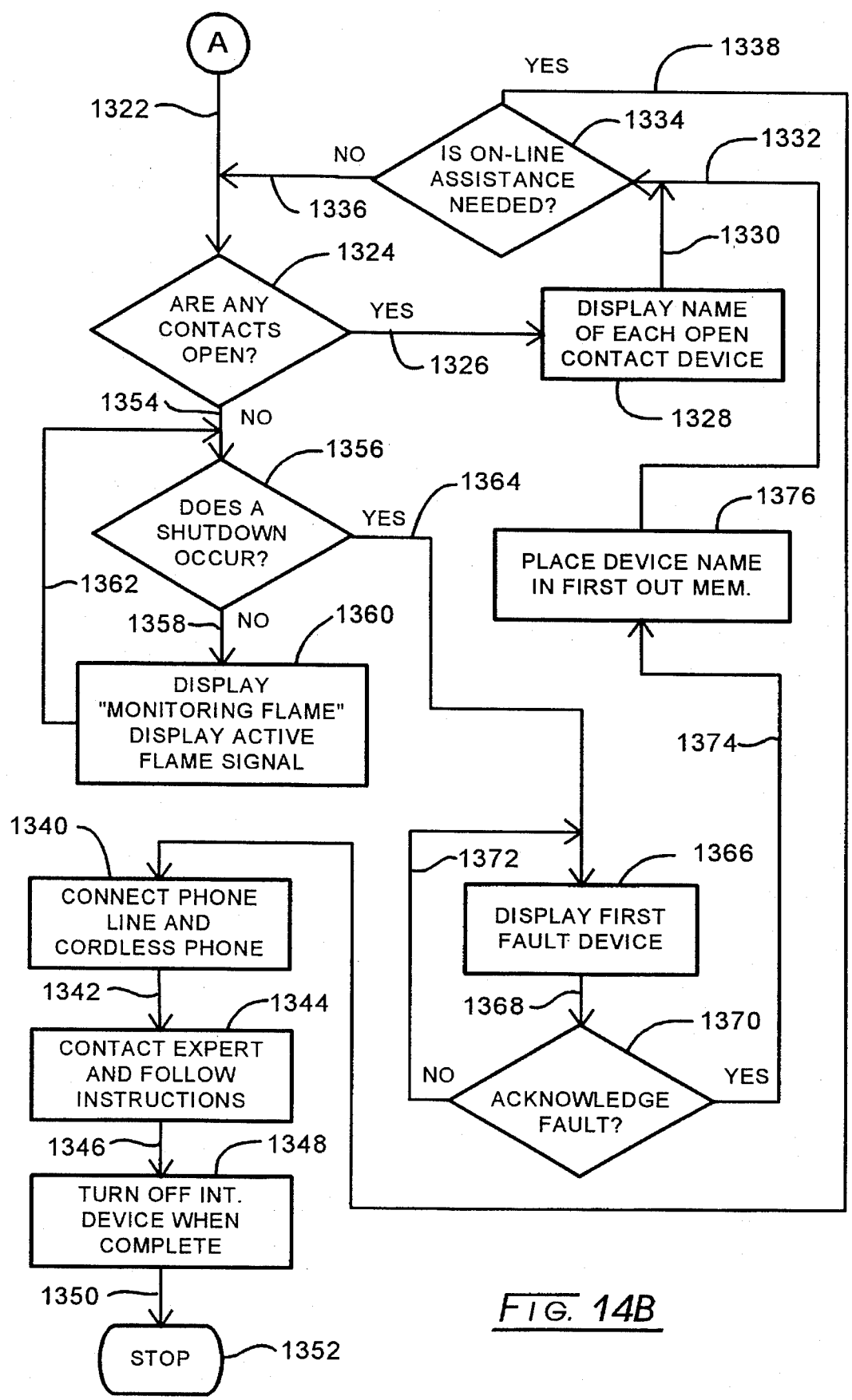

Referring to FIG. 14B, node A reappears in conjunction with line 1322 and block 1324. At block 1324, a query is made as to whether any of the safety system contacts are open. In the event one or more such contacts are open, then as represented at line 1326 and block 1328, the system displays the name of each open contact device. Then, as represented by lines 1330, 1332, and block 1334, the line technician determines whether online assistance is needed. In the event that it is not, the procedure returns to line 1322 as represented at line 1336. On the other hand, where a determination is made that online assistance is needed, then as represented at line 1338 and block 1340, the procedure represented at that block is one for connecting the phone line and cordless phone as illustrated in FIG. 2. Then, as represented at line 1342 and block 1344, the expert or consultant is contacted by telephone and the line technician becomes the eyes and ears of that expert at the location of the safety system. When the system has been diagnosed, as represented at line 1346 and block 1348, instrument 74 is turned off and, as represented at line 1350 and node 1352, the procedure is completed. With the arrangement, substantial down time is eliminated such as that encountered while waiting for consultant travel and the like as well as that time required for determining the architecture of the safety system itself, all such information being retained in non-volatile memory within device 74.

Returning to block 1324, where no safety system contacts are determined to be open, then as represented at line 1354 and block 1356, a determination is made as to whether shutdown occurs. In the event of a negative determination, then as represented at line 1358 and block 1360, the display 76 of device 74 provides a readout of the value of the flame signal derived from a flame monitor and the program returns in looping fashion to line 1354 as represented by line 1362.

Where an affirmative determination is made in connetion with block 1356, then as represented at line 1364 and block 1366, the display 76 also will reveal the identity of the first contact device to become open circuited. Then, as represented at line 1368 and block 1370, the line technician will be requested to acknowledge the rpesence of the fault by depressing an appropriate key of keypad 78. The procedure delays until such acknowledgment occurs as represented by loop line 1372.

When the fault is acknowledged, as represented at line 1374 and block 1376, the apparatus 74 will place the identification of the first contact device to have become open circuited in first-out memory and the program continues as represented at line 1332.

Since certain changes may be made in the above-described system and apparatus without departing from the scope of the invention herein involved, it is intended that all matter contained in the description thereof or shown in the accompanying drawings shall be interpreted as illustrative and not in a limiting sense.

We claim:

1. A diagnostic system for the rapid, trouble-shooting analysis of a production facility, said facility including a source of electric power and operationally identifiable electrical contacts coupled with said source, having a given network configuration, and having a closed circuit condition enabling its operation of said production facility and an open circuit condition disabling such operation, said facility further including a production parameter monitor providing an analog output as a variable electrical parameter, the diagnostic system comprising:

(a) monitoring interface apparatus mountable at said production facility, including:

fast terminals electrically connectable with said electrical contacts, a detector network electrically coupled with said first terminals and said source, configured in circuit continuity test relationship across each of said electrical contacts, and deriving an interface output condition when a said electrical contact exhibits said open circuit condition, an identifier component having an adjustable circuit configuration for providing a unique identifier condition corresponding with said production facility, second terminals electrically connectable with said production parameter monitor to convey said analog output, and a connector assembly electrically coupled with said detector network, said identifier component and said second terminals;

(b) an interrogator assembly, comprising:

a portable housing, a coupling assembly having a terminal assembly hand connectable with said connector assembly and extending to said housing for conveying said interface output condition, said identifier condition and said analog output, an address deriving network within said housing electrically coupled with said coupling assembly for deriving an identifier signal corresponding with said unique identifier condition, a fault detector network within said housing, electrically coupled with said coupling assembly and responsive to said interface output to derive contact condition signals corresponding with said open and closed circuit conditions, an input signal treatment network including an amplifier stage within said housing, electrically coupled with said coupling assembly and responsive to said analog output for deriving a treated parameter signal, an amplification network within said housing having an input responsive to a said treated parameter signal, having a gain defining network configurable to derive different amplification gain values, and providing a selectively amplified parameter signal, a first selector network within said housing controllable in accordance with configuration data corresponding with said network configuration to configure said gain defining network in correspondence with said analog output electrical parameter, an analog-to-digital converter within said housing responsive to said amplified parameter signal for deriving a digital parameter output corresponding therewith, a memory within said housing for retaining said configuration data, and data corresponding with said interface output with respect to each said identifier signal, a display mounted upon said housing and responsive to display signals for deriving a visually perceptible readout in correspondence therewith, modem means connectable with a communications system, responsive to a control input for effecting data mode conveyance of said memory retained data, said digital parameter output and said contact condition signals to a computer located at a remote site, manual input means mounted with said housing for entering said configuration data into said memory and providing manual command signals, and a processor within said housing responsive to said identifier signal for accessing said memory retained configuration data and effecting control of said first selector network, responsive to said digital parameter output and said contact condition signals to provide said display signals and said modem control input.

2. The diagnostic system of claim 1 including:

(c) a telephone electrically coupled with said housing for voice communication along said communications system with said remote site when enabled; and said processor is responsive to a select said command signal to alter said control input to said modem and enable said telephone for voice mode communication.

3. The diagnostic system of claim 1 in which said monitoring interface apparatus includes third terminals coupled with said first and second terminals and manually interconnectively programmable in correspondence with said network configuration to derive said configuration of said detector network.

4. The diagnostic system of claim 1 in which:

said input signal treatment network amplifier stage includes a first input signal treatment network electrically coupled with said cable assembly and responsive to said analog output as a voltage electrical parameter for deriving said treated parameter signal, and a second input signal treatment network electrically coupled with said cable assembly and responsive to said analog output as a current electrical parameter for deriving said treated parameter signal;

said interrogator assembly includes a second selector network within said housing, controllable to select said treated parameter signal from said first input signal treatment network or said second input signal treatment network; and said processor is responsive to said identifier signal for accessing said memory retained configuration data and effecting control of said second selector network.

5. The diagnostic system of claim 4 in which said interrogator assembly includes:

a test signal network controllable to have a test output emulating a said treated parameter signal; and said processor is responsive to control said test signal network and derive a said display signal corresponding with a result of said control.

6. The diagnostic system of claim 1 in which:

said input signal treatment network includes a scaling network controllable to effect a select amplitude scaling of said analog input;

said processor is responsive to said identifier signal for accessing said memory retained configuration data to effect control of said scaling network in correspondence therewith.

7. The diagnostic system of claim 4 in which:

said input signal treatment network includes a low pass filter network coupled, when enabled, to the output of said amplifier stage to effect filtering of said treated parameter signal;

including a third selector network within said housing controllable to enable said low pass filter network; and said processor is responsive to said identifier signal for accessing said memory retained configuration data and effecting control of said third selector network.

8. The diagnostic system of claim 1 in which:

said source of electric power is a.c. exhibiting a predetermined frequency;

said interrogator assembly includes a strobe defining network responsive to the waveshape deriving said predetermined frequency of said source to derive a periodic strobe signal; and said processor is responsive to said strobe signal to update said display signals and said modem control input.

9. A diagnostic system for analyzing safety system induced shutdowns of a production facility, said safety system including a source of electric power and operationally identifiable electrical contacts coupled with said source, having a given network configuration, and having a closed circuit condition enabling the operation of said production facility and an open circuit condition disabling such operation, said safety system further including a production parameter monitor providing an analog output as a variable electrical parameter, the diagnostic system comprising:

(a) monitoring interface apparatus mountable at said production facility, including:
  first terminals electrically connectable with said electrical contacts,
  a detector network electrically coupled with said first terminals and said source, configured forming shunts across successive said electrical contacts, said shunts having an impedance value substantially greater than that exhibited by said electrical contacts when in said closed circuit condition and deriving an interface output when a said electrical contact exhibits said open circuit condition,
  an identifier component having an adjustable circuit configuration for providing a unique identifier condition corresponding with said production facility,
  second terminals electrically connectable with said production parameter monitor to convey said analog output, and
  a connector assembly electrically coupled with said detector network, said identifier component and said second terminals;
(b) an interrogator assembly, comprising:
  a portable housing,
  a coupling assembly having a terminal assembly hand connectable with said connector assembly and extending to said housing for conveying said interface output, said identifier condition and said analog output,
  an address deriving network within said housing electrically coupled with said coupling assembly for deriving an identifier signal corresponding with said unique identifier condition,
  a fault detector network within said housing, electrically coupled with said coupling assembly and responsive to said interface output to derive contact condition signals corresponding with said open and closed circuit conditions,
  an input signal treatment network including an amplifier stage within said housing, electrically coupled with said coupling assembly and responsive to said analog output for deriving a treated parameter signal,
  an amplification network within said housing having an input responsive to a said treated parameter signal, having a gain defining network configurable to derive different amplification gain values, and providing a selectively amplified parameter signal,
  a first selector network within said housing controllable in accordance with configuration data corresponding with said network configuration to configure said gain defining network in correspondence with said analog output electrical parameter,
  an analog-to-digital converter within said housing responsive to said amplified parameter signal for deriving a digital parameter output corresponding therewith,
  a memory within said housing for retaining said configuration data, and data corresponding with said interface output with respect to each said identifier signal,
  a display mounted upon said housing and responsive to display signals for deriving a visually perceptible readout in correspondence therewith,
  modem means connectable with a communications system, responsive to a control input for effecting data mode conveyance of said memory retained data, said digital parameter output and said contact condition signals to a computer located at a remote site,
  manual input means mounted with said housing for entering said configuration data into said memory and providing manual command signals, and
  a processor within said housing responsive to said identifier signal for accessing said memory retained configuration data and effecting control of said first selector network, responsive to said digital parameter output and said contact condition signals to provide said display signals and said modem control input.

10. The diagnostic system of claim 9 including:
(c) a telephone electrically coupled with said housing for voice communication along said communications system with said remote site when enabled; and
said processor is responsive to a select said command signal to alter said control input to said modem and enable said telephone for voice mode communication.

11. The diagnostic system of claim 9 in which said monitoring interface apparatus includes third terminals coupled with said first and second terminals and manually interconnectively programmable in correspondence with said network configuration to derive said shunt forming configuration of said detector network.

12. The diagnostic system of claim 9 in which:
said input signal treatment network amplifier stage includes a first input signal treatment network electrically coupled with said cable assembly and responsive to said analog output as a voltage electrical parameter for deriving said treated parameter signal, and a second input signal treatment network electrically coupled with said cable assembly and responsive to said analog output as a current electrical parameter for deriving said treated parameter signal;
said interrogator assembly includes a second selector network within said housing, controllable to select said treated parameter signal from said first input signal treatment network or said second input signal treatment network; and
said processor is responsive to said identifier signal for accessing said memory retained configuration data and effecting control of said second selector network.

13. The diagnostic system of claim 12 in which said interrogator assembly includes:
a test signal network controllable to have a test output emulating a said treated parameter signal; and
said processor is responsive to control said test signal network and derive a said display signal corresponding with a result of said control.

14. The diagnostic system of claim 9 in which:
said input signal treatment network includes a scaling network controllable to effect a select amplitude scaling of said analog input;
said processor is responsive to said identifier signal for accessing said memory retained configuration data to effect control of said scaling network in correspondence therewith.

15. The diagnostic system of claim 12 in which:
said input signal treatment network includes a low pass filter network coupled, when enabled, to the output of said amplifier stage to effect filtering of said treated parameter signal;
including a third selector network within said housing controllable to enable said low pass filter network; and
said processor is responsive to said identifier signal for accessing said memory retained configuration data and effecting control of said third selector network.

16. A diagnostic system for analyzing safety system induced shutdowns of a production facility, said safety system including a source of electric power of given frequency defined waveshape duration and operationally identifiable electrical contacts coupled with said source, having a given network configuration, and having a closed circuit condition enabling the operation of said production facility and an open circuit condition disabling such operation, said safety system further including a production parameter monitor providing an analog output as a variable electrical parameter, the diagnostic system comprising:

(a) monitoring interface apparatus mountable at said production facility, including:

first terminals electrically connectable with said electrical contacts, a detector network electrically coupled with said first terminals and said source, configured having a sampling network coupled in circuit continuity test relationship across each of said electrical contacts responsive to said source waveshape and a sample comand to periodically convey a test pulse of duration substantially less than said waveshape duration across each of said electrical contacts and deriving an interface output condition when a said electrical contact exhibits said open circuit condition, an identifier component having an adjustable circuit configuration for providing a unique identifier condition corresponding with said production facility, second terminals electrically connectable with said production parameter monitor to convey said analog output, and a connector assembly electrically coupled with said detector network, said identifier component and said second terminals;

(b) an interrogator assembly, comprising:

a portable housing, a coupling assembly having a terminal assembly hand connectable with said connector assembly and extending to said housing for conveying said interface output, said identifier condition and said analog output, an address deriving network within said housing electrically coupled with said coupling assembly for deriving an identifier signal corresponding with said unique identifier condition, a fault detector network within said housing, electrically coupled with said coupling assembly and responsive to said interface output condition to derive contact condition signals corresponding with said open and closed circuit conditions, an input signal treatment network including an amplifier stage within said housing, electrically coupled with said coupling assembly and responsive to said analog output for deriving a treated parameter signal, an amplification network within said housing having an input responsive to a said treated parameter signal, having a gain defining network configurable to derive different amplification gain values, and providing a selectively amplified parameter signal, a first selector network within said housing controllable in accordance with configuration data corresponding with said network configuration to configure said gain defining network in correspondence with said analog output electrical parameter, an analog-to-digital converter within said housing responsive to said amplified parameter signal for deriving a digital parameter output corresponding therewith, a memory within said housing for retaining said configuration data, and data corresponding with said interface output with respect to each said identifier signal, a display mounted upon said housing and responsive to display signals for deriving a visually perceptible readout in correspondence therewith, modem means connectable with a communications system, responsive to a control input for effecting data mode conveyance of said memory retained data, said digital parameter output and said contact condition signals to a computer located at a remote site, manual input means mounted with said housing for entering said configuration data into said memory and providing manual command signals, and a processor within said housing responsive to said identifier signal for accessing said memory retained configuration data and effecting control of said first selector network, responsive to said digital parameter output and said contact condition signals to provide said display signals and said modem control input.

17. The diagnostic system of claim 16 including:

(c) a telephone electrically coupled with said housing for voice communication along said communications system with said remote site when enabled; and said processor is responsive to a select said command signal to alter said control input to said modem and enable said telephone for voice mode communication.

18. The diagnostic system of claim 16 in which said monitoring interface apparatus includes third terminals coupled with said first and second terminals and manually interconnectively programmable in correspondence with said network configuration to derive said circuit continuity test relationship coupling of said sampling network.

19. The diagnostic system of claim 16 in which:

said input signal treatment network amplifier stage includes a first input signal treatment network electrically coupled with said cable assembly and responsive to said analog output as a voltage electrical parameter for deriving said treated parameter signal, and a second input signal treatment network electrically coupled with said cable assembly and responsive to said analog output as a current electrical parameter for deriving said treated parameter signal;

said interrogator assembly includes a second selector network within said housing, controllable to select said treated parameter signal from said first input signal treatment network or said second input signal treatment network; and said processor is responsive to said identifier signal for accessing said memory retained configuration data and effecting control of said second selector network.

20. The diagnostic system of claim 19 in which said interrogator assembly includes:

a test signal network controllable to have a test output emulating a said treated parameter signal; and said processor is responsive to control said test signal network and derive a said display signal corresponding with a result of said control.

21. The diagnostic system of claim 16 in which:

said input signal treatment network includes a scaling network controllable to effect a select amplitude scaling of said analog input;

said processor is responsive to said identifier signal for accessing said memory retained configuration data to effect control of said scaling network in correspondence therewith.

22. The diagnostic system of claim 19 in which:

said input signal treatment network includes a low pass filter network coupled, when enabled, to the output of said amplifier stage to effect filtering of said treated parameter signal;

including a third selector network within said housing controllable to enable said low pass filter network; and said processor is responsive to said identifier signal for accessing said memory retained configuration data and effecting control of said third selector network.

* * * * *